（12） United States Patent
Chen

(10) Patent No.: US 8,566,360 B2
(45) Date of Patent: Oct. 22, 2013

(54) SYSTEM AND METHOD FOR AUTOMATICALLY GENERATING SYSTEMATIC REVIEWS OF A SCIENTIFIC FIELD

(75) Inventor: Chaomei Chen, Villanova, PA (US)

(73) Assignee: Drexel University, Philadelphia, PA (US)

( * ) Notice: Subject to any disclaimer, the term of this patent is extended or adjusted under 35 U.S.C. 154(b) by 119 days.

(21) Appl. No.: 13/117,508

(22) Filed: May 27, 2011

(65) Prior Publication Data

US 2011/0295903 A1    Dec. 1, 2011

Related U.S. Application Data

(60) Provisional application No. 61/349,632, filed on May 28, 2010.

(51) Int. Cl.
*G06F 17/30* (2006.01)

(52) U.S. Cl.
USPC .......................... 707/794; 715/256

(58) Field of Classification Search
USPC .......................... 707/794; 715/256
See application file for complete search history.

(56) References Cited

U.S. PATENT DOCUMENTS

| | | | |
|---|---|---|---|
| 6,243,713 B1 * | 6/2001 | Nelson et al. | 1/1 |
| 6,353,824 B1 * | 3/2002 | Boguraev et al. | 715/277 |
| 6,850,252 B1 * | 2/2005 | Hoffberg | 715/716 |
| 6,865,572 B2 * | 3/2005 | Boguraev et al. | 1/1 |
| 7,017,114 B2 * | 3/2006 | Guo et al. | 715/247 |
| 7,395,501 B2 * | 7/2008 | Graham et al. | 715/254 |
| 7,469,252 B2 * | 12/2008 | Niemoller et al. | 1/1 |
| 7,765,469 B2 * | 7/2010 | Sembower et al. | 715/243 |
| 8,126,837 B2 * | 2/2012 | Stollman | 706/55 |
| 8,156,154 B2 * | 4/2012 | Taranov et al. | 707/802 |
| 8,335,754 B2 * | 12/2012 | Dawson et al. | 706/45 |

\* cited by examiner

*Primary Examiner* — Kim Nguyen
(74) *Attorney, Agent, or Firm* — Woodcock Washburn, LLP

(57) ABSTRACT

A system and method are provided for automatically generating systematic reviews of received information in a field of science and technology, such as scientific literature, where the systematic review includes a systematic review of a research field in the scientific literature. The method is preferably implemented by a programmed computer and includes the steps of constructing a time series networks of words, passages, documents, and citations and/or co-citations within received information into a synthesized network, decomposing the networks into clusters of fields or topics, performing part-of-speech tagging of text within the received information to provide tagged text, constructing semantic structures of concepts and/or assertions extracted from the source text, generating citation-based and content-based summaries of the clusters of fields or topics and the semantic structures including measuring the saliency, novelty, significance, and transformative features of individual entities in the clusters of fields or topics and semantic structures, and generating structured narratives of the clusters of fields or topics and the summaries of the generated semantic structures, including labeling and summarizing features of the clusters of fields or topics and delinearizing the resulting clusters into templates that provide summarizations of the structure and trends of the information in the clusters at multiple levels of abstraction. Narratives of the citation-based and content-based summaries are merged into a systematic review having a predetermined arrangement.

31 Claims, 15 Drawing Sheets

SYSTEM AND METHOD FOR AUTOMATICALLY GENERATING SYSTEMATIC REVIEWS OF A SCIENTIFIC FIELD

CROSS REFERENCE TO RELATED APPLICATIONS

This application claims benefit of Provisional Application No. 61/349,632 filed May 28, 2010.

STATEMENT OF GOVERNMENT INTEREST

This invention was made with government support under Grant No. IIS-0612129 awarded by the National Science Foundation. The government has certain rights in the invention.

TECHNICAL FIELD

The invention relates to a system and method for automatically generating systematic reviews of a scientific field and, more specifically, to a system and method for transforming textual documents representing a scientific domain into an automatically constructed systematic narrative of the domain in terms of the structure and semantics of the underlying scientific literature. The invention also relates to a system and method for quantifying the potential value of newly available scientific work with reference to the systematic representation of the relevant scientific fields.

BACKGROUND

The volume of scientific publications in general has been increasing tremendously and rapidly across a wide range of scientific fields and disciplines. Such a rapid and tremendous increase means that scientists have to deal with an increasingly thick layer of transient information and that they have to distill the valuable knowledge from more noises and uncertainties associated with the overwhelming amount of input as a whole in a timely way.

The core knowledge of a scientific field is largely documented in its literature in the form of peer reviewed and non-peer reviewed publications. Peer reviewed publications are considered of higher value than non-peer reviewed ones because the science reported in peer reviewed publication is safeguarded by peer scientists and they are more likely to have met the rigorous and stringent criteria. This description will primarily focus on peer reviewed publications; however, those skilled in the art will appreciate that the method described herein is equally applicable to non-peer reviewed publications and other types of text such as patent applications and technical reports.

A body of scientific literature serves two primary roles in the advancement of science: archival and communicative roles. A well-known conception of the structure of scientific literature in the study of science is that scientific literature consists of two principal components: one is classic and the other is transient. The classic component of scientific literature contains well-documented and well-established knowledge of a scientific field; or collective domain knowledge associated with the underlying scientific community. The classic component forms the backbone of the domain knowledge because it represents the fundamental value of the scientific domain, including its principles, methodologies, and major claims. In contrast, the transient component represents the most recent attachment to the backbone structure. It includes the latest publications of new results and new findings. The nature of such attachment remains transient until new publications have been subject to the selection of the scientific community. Such transient layers are sometime known as research fronts. The selection can lead to one of the outcomes: acceptance, rejection, and indifference, although both the structure of such backbones and these outcomes regarding the research fronts are subject to further change as new evidence becomes available or new theories become predominant. The degree of a selection is often measured in terms of the citations received, i.e. the number of times subsequently published articles make references to the work. The more citations of a work, the greater its perceived impact is on the scientific field and therefore the more value it adds to the development of scientific knowledge.

Systematic reviews, comprehensive surveys, and meta analytical studies are among the most common and effective means used by scientists, scholars, and people with similar needs to maintain their understanding of their fields. These methods share similar goals of identifying significant contributions and potential challenging issues and future research directions. They all rely on scientific literature as a primary source of input and try to clarify the state of the art. On the other hand, they have some inherited shortcomings: time consuming, labor intensive, biased by the view of the few. As a result, such reviews are often separated by an extensive period of time. These reviews and surveys are typically performed by experts. Since experts tend to be specialized in some but not all areas of a field, the coverage can be biased by their own preferences and knowledge.

A new approach to reviewing developments in a scientific field without the bias and time consuming approach of the prior art is desired. In particular, a technique is desired whereby quantitative, as opposed to qualitative, reviews of a scientific field may be generated automatically with high scalability and medium to low cost. The present invention is designed to address these needs in the art.

SUMMARY

The invention addresses the afore-mentioned needs in the art by transforming a stream of textual documents representing a scientific domain into an automatically constructed systematic narrative of the domain in terms of the structure and semantics of its literature. The system and method described herein overcomes some of the major weaknesses of the traditional labor-intensive approaches so that it can automatically generate a summary of the state of the art of a field. The invention may be applied to the study of a field repeatedly, periodically, and on-demand. New reports and updates can be generated at minimum costs. Automatically generated summaries will be valuable in their own right as a new form of documentation. In addition, the summaries may be incorporated into a traditional review method with a considerably reduced amount of overhead.

In accordance with an exemplary embodiment of the invention, a method of automatically generating systematic reviews of information received from a source text in a field of literature, such as scientific literature, includes the steps of constructing associative networks of entities such as words, sentences, documents, journals, institutions, and citations within the received information; decomposing the associative networks into clusters of topics or fields; performing information extraction with natural language techniques such as part-of-speech tagging of text within the received information; constructing semantic and ontological structures of concepts and/or assertions extracted from the source text; generating citation-based and content-based summaries of the clusters of topics or fields and the semantic and ontological structures; and generating structured narratives of the clusters of field or topic-characterizing entities and the summaries of the generated semantic structures. The method also includes the step of merging narratives of the citation-based and content-based summaries into a systematic review having a predetermined arrangement.

In an exemplary embodiment, the step of generating citation-based and content-based summaries of the clusters of fields or topics and the semantic structures includes measuring the saliency, novelty, significance, and transformative features of individual entities in the clusters of fields or topics and semantic representations of the underlying knowledge. In the exemplary embodiment, the step of generating structured narratives of the cluster of fields or topics and the summaries of the generated semantic structures includes labeling and summarizing features of the clusters of fields or topics and delinearizing the characteristics of such clusters into templates that provide summarizations of the structure and trends of the topic or field evolution at multiple levels of abstraction.

Particular embodiments of the method include constructing associative networks of scientific publications, including citation, co-citation, and other types of semantic networks, within the received information by selecting node types and link types for each time slice of the received information, computing similarity or proximity scores for the nodes, constructing networks of the node information, and merging respective networks from different time slices. The associative networks are then decomposed into clusters of research topics by clustering nodes and measuring quality of the clustering by calculating structural diagnostic scores such as modularity and mean silhouette scores. In such embodiments, generating citation-based and content-based summaries of the clusters of fields or topics and the semantic structures includes identifying citers to and cited members of a cluster, summarizing structural and temporal properties of the cluster, computing metrics of saliency and novelty for an associative network formed by the cluster, ranking the clusters based on the saliency and/or novelty metrics, and generating structured narratives from the ranked clusters. The structured narratives of the clusters of fields or topics and the summaries of the generated semantic structures may be generated by selecting a narrative template from a set of predefined templates.

The part-of-speech tagging is performed by annotating the received information by a type of each word in the received information and segmenting the received information into sentences, paragraphs, or other types of passages. On the other hand, constructing semantic structures of concepts and/or assertions extracted from the tagged text includes the step of constructing a structured representation of concepts and a semantic network of assertions in the received information and merging a newly constructed semantic structure with an existing semantic structure to differentiate different sources for the newly constructed and existing semantic structures. The merged structures may be ranked based on saliency and novelty, generating narratives of top ranked concepts and/or assertions in the received information, and merging generated narratives in a predetermined order.

The scope of the invention also includes systems having programmed processors and computer readable storage media having instructions stored thereon for implementing the methods of the invention.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements shown. In the drawings.

DETAILED DESCRIPTION OF ILLUSTRATIVE EMBODIMENTS

A detailed description of illustrative embodiments of the present invention will now be described with reference to FIGS. 1-20. Although this description provides a detailed example of possible implementations of the present invention, it should be noted that these details are intended to be exemplary and in no way delimit the scope of the invention.

System Overview

Figure 1:
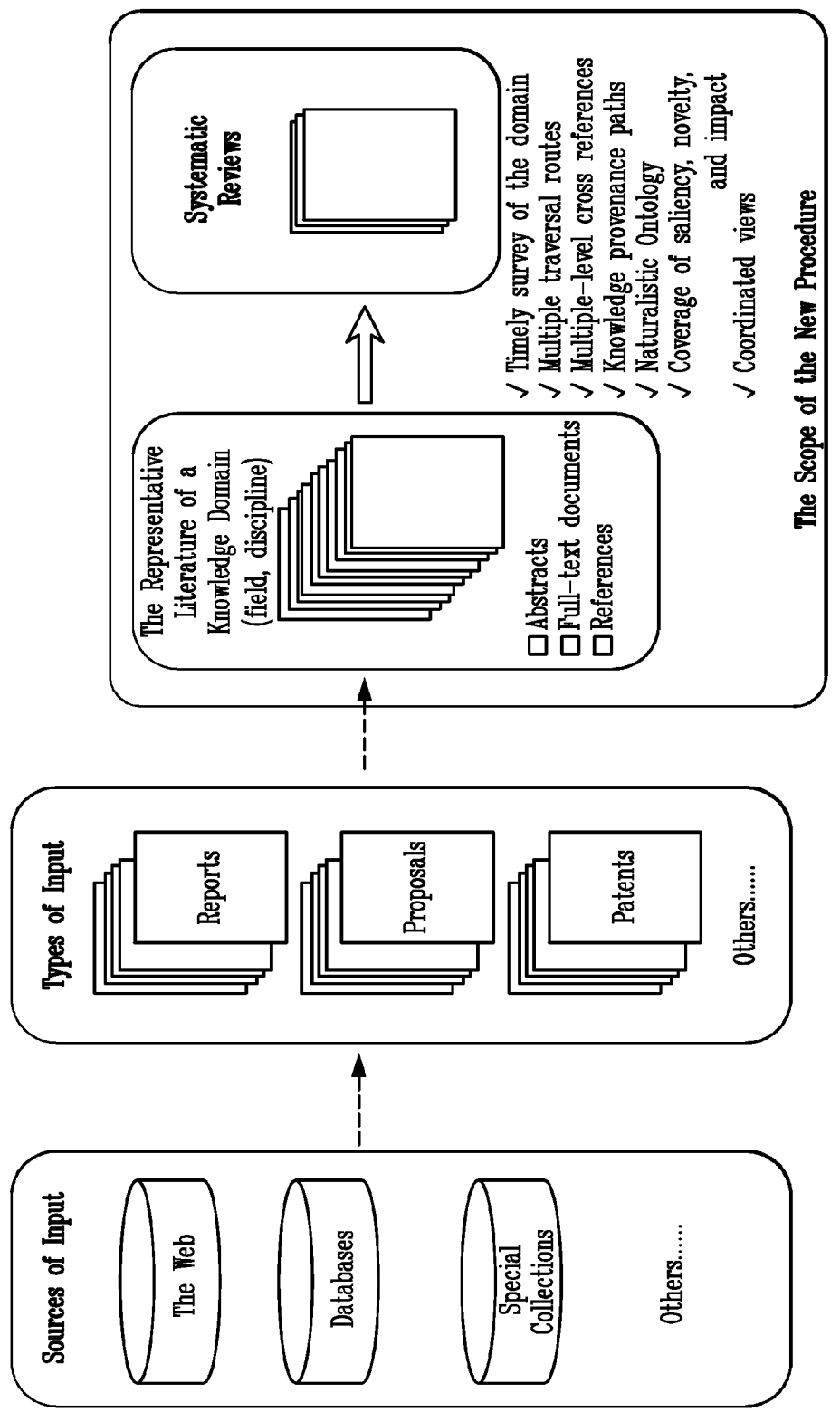
FIG. 1 illustrates the context of the procedure of the invention whereby systematic reviews are generated from the representative literature in a knowledge domain.
Figure 2:
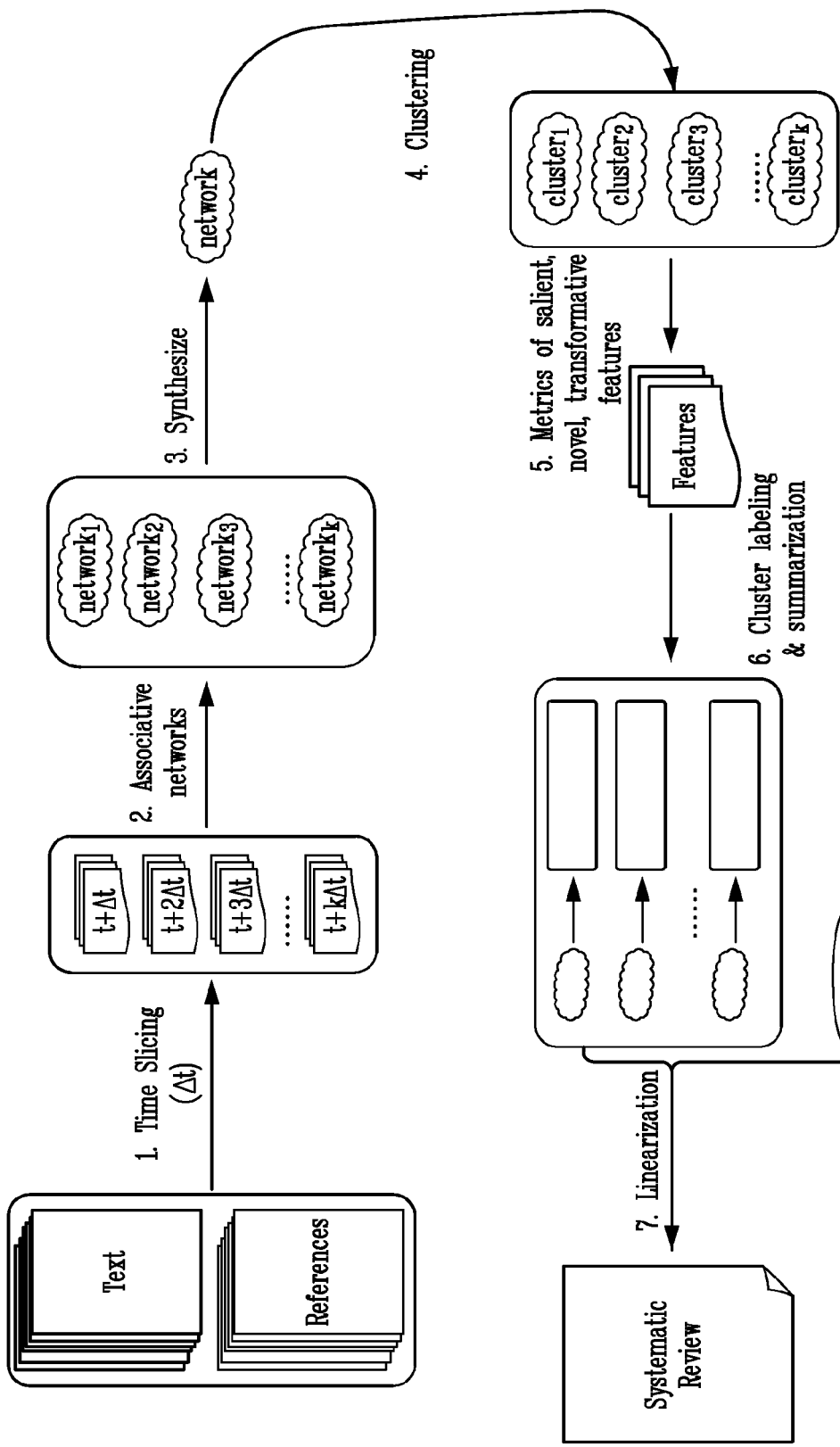
FIG. 2 illustrates the steps performed in order to generate systematic reviews naturally in accordance with the invention.

FIG. 1 illustrates the context of the procedure of the invention whereby systematic reviews are generated from the representative literature in a knowledge domain. As illustrated, different source of input, such as the Internet, databases, special collections, and the like, provide different types of input, such as reports, proposals, and patents, to a procedure for the generation of a knowledge domain representing a particular field or discipline. In accordance with the invention, systematic reviews of the information in the knowledge domain are generated using the techniques described herein. In order to generate such systematic reviews naturally, the system time generally performs the steps depicted in FIG. 2. As illustrated in FIG. 2, the system provides time slices of the received information (e.g., text and reference data), constructs associative networks of the time sliced data, synthesizes a time series of networks into a synthesized network, clusters the synthesized network, measures the saliency, novelty, significance, and transformative features of the individual entities in the clusters, labels and summarizes the clusters, and delinearizes the resulting clusters into templates to provide summarizations of the structure and trends of the information at multiple levels of abstraction. These concepts will be described more fully below.

1. Time Slicing

The purpose of time slicing is to establish the sampling rate that should be applied to the events of interest. The window of observation w is the entire time interval of interest, for example, a century, a few decades, or several weeks. Time slicing divides the window of observation into consecutive time slices $\{w_i\}$. The process of time S slicing can be expressed as a mapping from $w \rightarrow \{w_i\}$, where $w_i = [t_i, t_{i+1}]$, for $t_i < t_{i+1}$:

$$S(w, \text{overlap}(n), \text{width}(n)) = (w_n) \quad (1)$$

$$\bigcup_i w_i = w \quad (2)$$

$$\text{overlap}(n) = w_n \cap w_{n-1} \quad (3)$$

$$\text{width}(n) = t_n - t_{n-1} \quad (4)$$

The function overlap(n) defines whether adjacent time slices should overlap. The width(n) function defines the duration of each time slice. Equation 2 ensures that the partition covers the entire window of observation.

Figure 3:
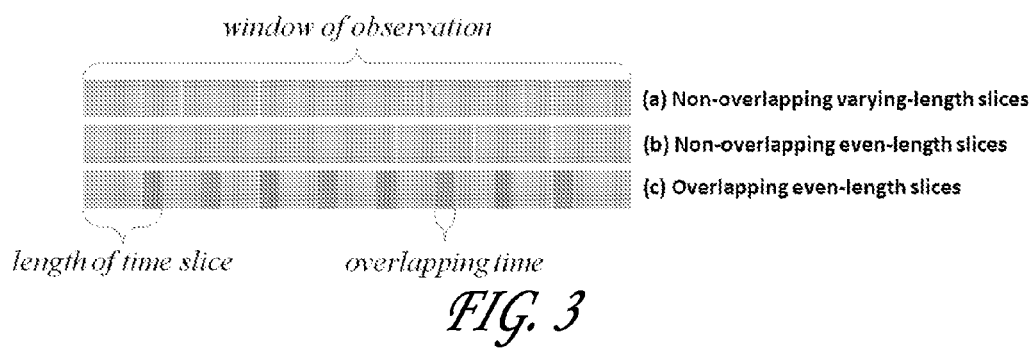
FIG. 3 illustrates the three most common strategies for time dividing most observation windows.

Most observation windows can be meaningfully divided using one of the three most common strategies, a, b, or c, as shown in FIG. 3. As illustrated in FIG. 3, a non-overlapping varying-length time slicing is defined with the following overlap and width functions:

$$\text{overlap}(n) = w_n \cap w_{n-1} = \emptyset \quad (5)$$

$$\text{width}(n) = t_n - t_{n-1} = f(n) \quad (6)$$

A non-overlapping even-length time slicing is defined with the following overlap and width functions:

$$\text{overlap}(n) = w_n \cap w_{n-1} = \emptyset \quad (7)$$

$$\text{width}(n) = t_n - t_{n-1} = \text{constant} \quad (8)$$

An overlapping even-length time slicing is defined with the following overlap and width functions, for example, with a 25% of overlap between adjacent time slices:

$$\text{overlap}(n) = w_n \cap w_{n-1} = [0.75 * t_n, t_n] \quad (9)$$

$$\text{width}(n) = t_n - t_{n-1} = \text{constant} \quad (10)$$

The type b of time slicing is the simplest and the most common choice. For continuity reasons, one may consider overlapping time slicing strategy c. For density reasons, one may consider the option a so that each time slice contains the same number of observations.

The time slicing of text can be done based on the creation time or the last updated time of the text. On the other hand, the time slicing of references can be done based on the time a reference was made, for example, all the references made in year 2009.

2. Constructing Associative Networks

For each time slicing strategy, one can derive a time series of associative networks. These networks serve as a sequence of snapshots of an evolving process. Each network is defined by a set of entities (nodes or vertices) and a set of relations (links or edges). The following notations are used for $G_i = G(V_i, E_i, w_i)$, the network defined in the $i^{th}$ time slice $w_i$:

$V_i$ is the set of vertices, i.e. entities;

$E_i$ is the set of edges, i.e. relations, which can be weighted or not weighted; and $w_i$ is the $i^{th}$ time slice.

A given entity may not appear in all the time slices. A network may contain multiple types of entities and/or multiple types of relations. For example, a hybrid network may contain keywords and references as two distinct types of entities and co-occurrence and referencing as two distinct types of relations.

If the only available source is text, i.e. with no references, possible choices of entities include words, phrases, and index terms (either given by the original authors or assigned by human indexers) as well as documents. Interrelations among these entities include direct counts of co-occurrence in containing units such as sentences, paragraphs, or documents. Other types of interrelations may be derived from higher order matrix operations such as singular value decomposition of term-by-document matrices. Interrelations may be also derived from linguistic patterns, for example, associations between a head noun and its modifiers as the connection between star and formation from star formation. Table 1 illustrates possible types of entities and relations for text, including but not limited to (1) co-occurrence and (2) similarity (including mutual information, vector space model etc.).

TABLE 1

| | Word | Phrase | Index term | Sentence | Passage | Document | Cluster |
|---|---|---|---|---|---|---|---|
| Word | 1 | 1 | 1 | 2 | 2 | 2 | 2 |
| Phrase | | 1 | 1 | 2 | 2 | 2 | 2 |
| Index term | | | 1 | 2 | 2 | 2 | 2 |
| Sentence | | | | 2 | 2 | 2 | 2 |
| Passage | | | | | 2 | 2 | 2 |
| Document | | | | | | 2 | 2 |
| Cluster | | | | | | | 2 |

If references are available in the sources of input, network entities include cited references as well as all the entities derivable from text. The citation context of a cited reference is defined as the hosting sentence, paragraph, document, or a cluster of documents based on textual similarity or citation similarity. Table 2 illustrates relations in associative networks involving cited references.

TABLE 2

|  | Citation Context | Cited Reference |
|---|---|---|
| Citation Context | Similarity | Citation |
| Cited Reference | Citation | Co-citation |

3. Synthesizing a Time Series of Networks

Individual networks corresponding to a given time slicing scheme are synthesized over the entire time span of interest. Different networks $G_i=G(V_i, E_i, w_i)$ are synthesized into $G(V, E, w)$ in one of the two methods: naïve or advanced. The naïve method is defined in equations 11-13, by simply taking set unions of the entities and all relations.

$$V = \bigcup_{i=0}^{n} V_i \quad (11)$$

$$E = \bigcup_{i=0}^{n} E_i \quad (12)$$

$$w = \bigcup_{i=0}^{n} w_i \quad (13)$$

The advanced method, on the other hand, is defined in equations 14-16. The key difference between the naïve and the advanced methods is that existing relations in component networks are selectively added to the merged network in equation 15. Given two adjacent networks, edges that appear in only one network but not the other network will be added to the merged network. However, edges that appear in both networks will be pruned and only edges that are preserved by the pruning operation will be added to the merged network. In other words, the overlapping structure between the two networks will be simplified to the most salient linkage only.

$$V = \bigcup_{i=0}^{n} V_i \quad (14)$$

$$E = \left( \bigcup_{i=0}^{n-1} (E_i \cup E_{i+1} - E_i \cap E_{i+1}) \cup \left( \bigcup_{i=0}^{n-1} \text{pruning}(E_i \cap E_{i+1}) \right) \right) \quad (15)$$

$$w = \bigcup_{i=0}^{n} w_i \quad (16)$$

Candidate pruning functions include minimal spanning tree (MST), Pathfinder network scaling (PFnet), and any other link reduction operations. It is known that a Pathfinder network is the set union of all the possible minimal spanning trees of the original network:

$$PFnet(G) = \bigcup MST(G) \quad (17)$$

The primary motivation for pruning the overlapping edges across adjacent networks is to clarify the most salient structural characteristics of the underlying knowledge transformation from one time slice to the next.

The synthesized network can be visualized with visual encoding to highlight temporal aspects of the underlying knowledge transformation. For example, edges can be colored in corresponding to the time slice in which associative connections were made for the first time. Alternatively, edges can be colored by the most recent time slice.

Figure 4:
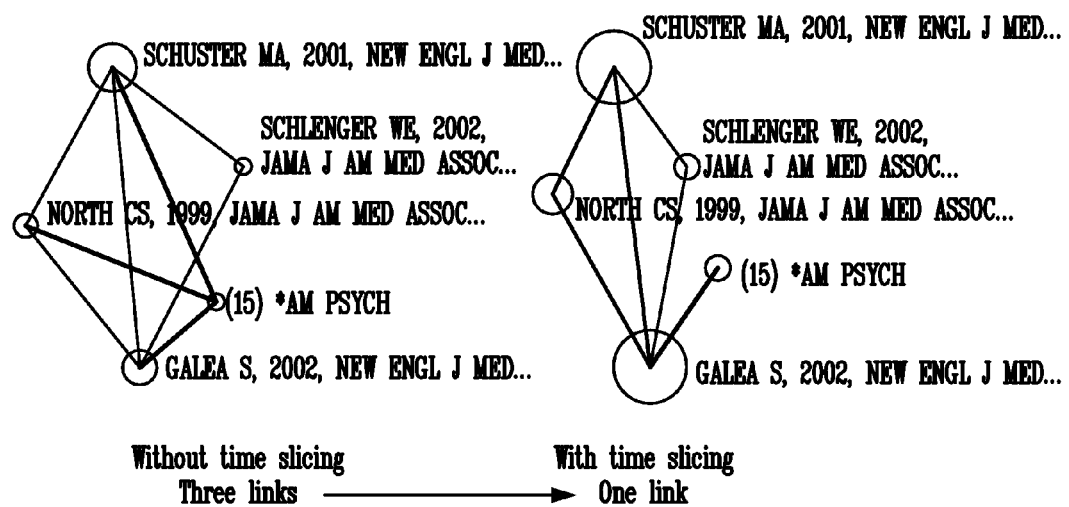
FIG. 4 illustrates the effect of time slicing in accordance with the invention.

FIG. 4 illustrates the effect of time slicing. In this example, the entire window of observation is two years, i.e. 2002-2003. The network component shown on the left is constructed without time slicing, whereas the one on the right is constructed with time slicing. The one without time slicing shows that *AM PSYCH, which is the 1994 psychiatric guideline by the American Psychiatry Association, has three direct links to three nodes. In contrast, the one with time slicing shows the most salient links only, in this case 1 link only. The effect of emphasizing the most salient links is particularly important in the subsequent stages of the process because these salient links will form preferred paths for summarization algorithms to traverse the network and delineate the essence of the evolution of knowledge.

4. Clustering the Synthesized Network

Once the time series of networks are synthesized into a panoramic network spanning the entire time frame, the next step is to aggregate individual nodes and links and form components of higher-level abstraction. By grouping similar nodes and links together, one can identify emergent patterns at higher levels and produce a clarified macroscopic structure. The aggregated structure will be used as key components in the subsequent narrative generation steps. Since this step is clustering by nature, it is referred to herein as the clustering step. However, this step is also known as graph decomposition because as a result of the step, the network is divided into a number of groups, or cluster's, such that members of the same cluster are more similar, as measured in a chosen metric, than members from different clusters.

The best clustering algorithm would make no assumption about the structure or the distributions of nodes and links. It should be purely based on the strengths of linkage. The spectral clustering family of algorithms provides the best candidate clustering algorithms to meet this requirement.

Hard clustering approaches partition a network into a number of non-overlapping clusters. It is more efficient to use non-overlapping clusters than overlapping ones to differentiate the nature of different co-citation clusters, although it is conceivable to derive a soft clustering version of this particular component.

Co-citation similarities between items i and j are measured in terms of cosine coefficients. If A is the set of papers that cites i and B is the set of papers that cite j, then $$w_{ij} = \frac{|A \cap B|}{\sqrt{|A| \times |B|}},$$

where $|A|$ and $|B|$ are the citation counts of i and j, respectively; and $|A \cap B|$ is the co-citation count, i.e., the number of times they are cited together. Alternative similarity measures are also available. For example, Small ("Co-citation in the scientific literature: A new measure of the relationship between two documents," Journal of the American Society for Information Science, Vol. 24, pp. 265-169 (1973)) used $$w_{ij} = \frac{|A \cap B|}{|A \cup B|},$$

which is known as the Jaccard index.

A good partition of a network would group strongly connected nodes together and assign loosely connected ones to different clusters. This idea can be formulated as an optimization problem in terms of a cut function defined over a partition of a network. Technical details of spectral clustering algorithms are given by (Luxburg in "A tutorial on spectral clustering," http://www.kyb.mpg.de/publications/attachments/Luxburg06_TR_%5B0%5D.pdf, Ng, et al. in "On spectral clustering: Analysis and an algorithm," Advanced in Neural Information Processing Systems, Vol. 14(2), pp. 849-856 (2002), and Shi, et al in "Normalized Cuts and Image Segmentation," IEEE Transactions on Pattern Analysis and Machine Intelligence, Vol. 22(8), pp. 888-905 (2000). A partition of a network G is defined by a set of sub-graphs $\{G_k\}$ such that $$G = \bigcup_{k=1}^{K} G_k$$

and $$G_i \cap G_j = \phi,$$

for all i≠j. Given sub-graphs A and B, a cut function is defined as follows:

$$\text{cut}(A, B) = \sum_{i \in A, j \in B} w_{ij},$$

where $w_{ij}$'s are the cosine coefficients mentioned above. The criterion that items in the same cluster should have strong connections can be optimized by maximizing $$\sum_{k=1}^{K} \text{cut}(G_k, G_k).$$

The criterion that items between different clusters should be only weakly connected can be optimized by minimizing $$\sum_{k=1}^{K} \text{cut}(G_k, G - G_k).$$

The cut function is normalized by $$\sum_{k=1}^{K} \frac{\text{cut}(G_k, G - G_k)}{\text{vol}(G_k)}$$

to achieve more balanced partitions, where $\text{vol}(G_k)$ is the sum of the weights of links in $G_k$, i.e.

$$\text{vol}(G_k) = \sum_{i \in G_k} \sum_{j} w_{ij}.$$

Spectral clustering algorithms identify clusters based on eigenvectors of Laplacian matrices derived from the original network. Spectral clustering has several desirable features compared to traditional algorithms such as k-means and single linkage. For example, spectral clustering is more flexible and robust because it does not make any assumptions on the forms of the clusters, because it makes use of standard linear algebra methods to solve clustering problems, and because it is often more efficient than traditional clustering algorithms.

Figure 5:
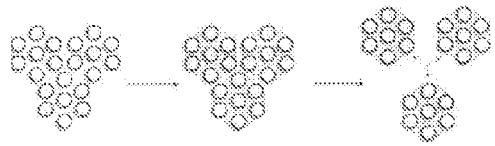
FIG. 5 illustrates the clustering process in accordance with the invention.

FIG. 5 illustrates the clustering process whereby a network is decomposes into clusters according to the strengths of linkage. Clusters are identified in the original network. Once clusters are identified, the cluster structure can be used to further differentiate members in different clusters by further weakening the strengths of linkage across distinct clusters (as illustrated by the third diagram on the right in FIG. 5). Systematic reviews will be generated in corresponding to the level of clusters because clusters are better representations of underlying topics with a stable and adequate context than individual articles.

5. Measuring Saliency, Novelty, and Significance

The resultant clusters provide an appropriate context for defining the saliency, novelty, and significance of individual entities. Several types of importance can be derived from a given clustered structure.

Saliency

The saliency of a node can be defined within the scope of its cluster, its cluster plus neighboring clusters, or the entire network. The one that is defined by its own cluster is the most meaningful choice because its hosting cluster will give enough contextual information while maintaining a clearly differentiable focus.

Figure 6:
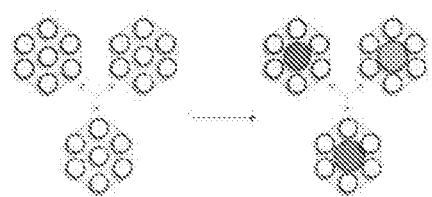
FIG. 6 illustrates the saliency of a node as a measure of the prominence of it within the scope of a cluster, for example, the frequency of a node n, f(n), or a citation of a reference.
Figure 7:
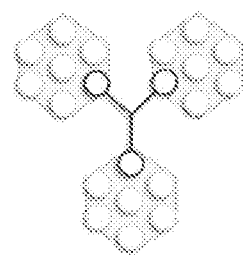
FIG. 7 illustrates the unique positions of three highlighted nodes (of high betweenness centrality) make them more likely to host novel ideas than other positions in the network.

As illustrated in FIG. 6, the saliency of a node measures the prominence of it within the scope of a cluster, for example, the frequency of a node n, f(n), or a citation of a reference. The homogeneity within a cluster makes it more meaningful to compare the saliency function of nodes in the same cluster than comparing nodes in different clusters. In other words, the saliency of nodes in the red, green, and blue clusters may not be meaningful to compare across clusters, especially across disciplinary boundaries and fields. Candidates of saliency measures include frequency, appearances, probability, likelihood, information entropy, in degree, out degree, age, and many others.

Novelty

The novelty of an entity or a relation in a network measures the extent to which the entity or the relation is new with respect to the history of the network evolution. The simplest notion of novelty can be defined as something that has never seen in the past. A more useful measure of novelty needs to identify not only something that is new, but also potentially valuable. The potential value of an entity or a relation can be estimated with reference to their positions in the network, especially in terms of clusters.

There are three relevant aspects of the novelty measurement: structural, temporal, and semantic metrics. Structural metrics include measurements such as centrality, modularity, and silhouette. Temporal and hybrid metrics include citation burstness and novelty. Structurally, an entity or a relation that links distinct clusters is potentially valuable. The emergence of such items may imply noteworthy novelty. Betweenness centrality can be used to identify bridges or gatekeepers between clusters. The betweenness centrality metric is defined for each node, also possible for each link, in a network. The metric measures the probability that the node, or the link, is in the middle of an exclusive path connecting other nodes or distinct areas of a network. The higher such a probability is, the higher the centrality value is. High betweenness centrality values identify potentially revolutionary scientific publications as well as gatekeepers in social networks. Other types of centrality measures are also available, including the power centrality introduced by Bonacich in "Power and centrality: A family of measures," American Journal of Sociology, Vol. 92, pp. 1170-1182 (1987) and PageRank. The strategically significant positions of these bridges and gatekeepers should be closely watched as these are the important candidates to be featured in systematic reviews of the subject matter. For example, in FIG. 7, the unique positions of the three highlighted nodes (of high betweenness centrality) make them more likely to host novel ideas than other positions in the network.

The novelty of a connection made by an article in a co-citation network reflects the potential novelty of the underlying idea with reference to the structure prior to the publication of the article. Modularity variation rate ($\Delta$Modularity), inter-cluster brokerage, and centrality variation divergence ($\Delta$Centrality) are introduced herein as novel metrics of structural variation. The first two are defined based on the cluster structure of the underlying network, whereas the third is defined based on individual nodes. These three measures are referred as intrinsic measures of creativity. For comparison, the number of cited references (NR) and the length of each article in terms of the number of pages (Length) are also included because they are among the most commonly used predictors of future citations of an article. These two measures are referred as extrinsic measures.

A $\Delta_{modularity}$ is defined to measure the novel associations added across aggregations of nodes. First, decompose G(V, E) to a set of clusters, $\{C_k\}$; in this case, $C_k$ is a co-citation cluster. Given a cluster configuration, the modularity of the network can be computed. The modularity measures whether the network can be decomposed nicely with the given clusters. A high modularity means that the given cluster configuration can divide the network into relatively independent partitions with few cross cluster edges. In contrast, a low modularity means that the given cluster configuration cannot divide the network without many cross-cluster edges. If a new paper s' adds an edge connecting members of the same cluster, it will have no impact on the modularity. It will not make any difference to the value of $\Delta_{modularity}$. On the other hand, if s' adds an edge between different clusters and the two clusters are previously not connected, the modularity of the new structure will be lower than that of the original structure.

The modularity of a network is a function of a set of alternative partitions of the network. Some partitions lead to a higher modularity, whereas others lead to lower modularity scores. The optimal partition can be determined based on the variation of modularity scores over different partitions of the same network. Since the maximum modularity implies the maximum separation of various network components, it is often used as a criterion to choose the corresponding clusters as the most representative solution.

The modularity variation rate of an article a is defined to capture the extent to which the modularity of the co-citation network changes as a result of connections made by a particular article. This definition assumes that the network is decomposed into a number of clusters.

$$\Delta \text{Modularity}(a) = \frac{\text{Modularity}(G \cup \text{Citations}(a))}{\text{Modularity}(G)}$$

The new connection led to a reduction of the modularity.

Inter-cluster brokerage is also defined as the basis of a network decomposed into clusters. For each article a, this metric is defined as follows:

$$\text{Brokerage}_{Clusters}(a) = \sum_{ij} \delta_{ij} \cdot (1 - w_{ij})$$

$\delta_{ij}$=0 if i$\in C_j$, 1 otherwise

The function $\delta_{ij}$ scores 1 if the article a adds a link between references i and j across different clusters. The score is weighted by the overlap between the corresponding clusters $\omega_{ij}$. This metric takes the position of each node in the network into account. It is defined according to the change of centrality scores of all the nodes in the network. The node centrality of a network G(V, E), C(G), is a distribution of the centrality scores of all the nodes, $<c_1, c_2, \ldots, c_n>$, where $c_i$ is the centrality of node $n_i$ and n is |V|, the total number of nodes. The degree of structural change $\delta E$ can be defined in terms of the K-L divergence; this metric is denoted as $\Delta_{centrality}$.

Figure 8:
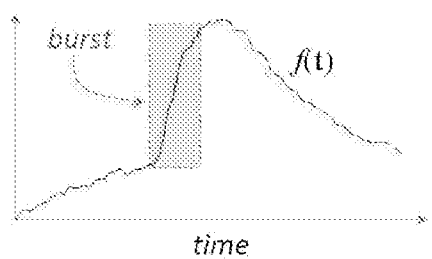
FIG. 8 illustrates the burst of a function f(t) over time for identifying useful candidates for identifying the temporal aspect of novelty.

Temporally, it is more valuable to identify an entity or a relation as part of an emerging trend rather than an isolated event. Burst detection determines whether a given frequency function has statistically significant fluctuations during a short time interval within the overall time period. Burst detection is valuable for citation analysts to detect whether and when the citation count of a particular reference has surged. It can also be used to detect whether a particular connection has been significantly strengthened within a short period of time. The notion of burst detection provides a useful candidate for identifying the temporal aspect of novelty. The goal of burst detection is to identify a particularly intensified attention spell directed towards an entity or a relation with respect to others during the same period of time. FIG. 8 illustrates the burst of a function f(t) over time. Burst detection algorithms such as the one described by Kleinberg in "Bursty and hierarchical structure in streams," Proceedings of the 8$^{th}$ ACM SIGKDD International Conference on Knowledge Discovery and Data Mining, pp. 91-101, ACM Press (2002) may be used in an exemplary embodiment of the invention as described herein.

The third aspect of novelty is semantics. An idea that either is introduced for the first time or that contradicts previous or existing beliefs defines a semantically novel idea. The semantic novelty of an entity or a relation can be identified by algorithms that model ontological relations based on natural language processing techniques. For example, when the term gastric bacteria was first mentioned, it contradicted the then-contemporary knowledge that bacteria cannot survive in gastric organs. The appearance of the two words gastric and bacteria can be used by algorithms to construct a knowledge representation based on published articles on a given topic. If a particular instance is not found in the existing knowledge representation, then it is likely to be semantically novel. The coverage and accuracy of novelty detection can be improved by using domain-independent resources such as WordNet and domain-specific controlled vocabulary systems such as the Metathesaurus in UMLS so that different expressions of the same underlying concept in natural language text can be detected.

Figure 9:
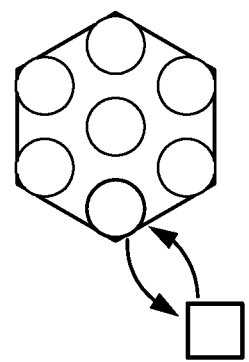
FIG. 9 illustrates that if the connection between a square and a circle has never been documented in scientific literature, the relation is regarded as semantically novel.

As illustrated in FIG. 9, if the connection between a square and a circle has never been documented in scientific literature, the relation is regarded as semantically novel. The degree of novelty can be measured in terms of the likelihood that such relations exist based on their distance in the knowledge representation. A semantic distance is defined as the least number of links along the shortest path connecting two entities in an ontological representation, e.g. a hierarchical structure of concepts.

It is possible to define integrative metrics of saliency, novelty, and significance by incorporating each individual metric. For example, a sigma metric a has been derived by Chen et al. in "Towards an explanatory and computational theory of scientific discovery," Journal of Informetrics, Vol. 3(3), pp. 191-209 (2009) to identify transformative research (scientific novelty) by combining betweenness centrality $\phi$ and burstness $\delta$ as:

$$\sigma = (\phi+1)^{\delta} \qquad (18)$$

With the definition as Equation 18, the transformativeness becomes equivalent to betweenness centrality plus one if no burstness is detected. Holding the burstness constant, the higher the betweenness centrality, and the stronger the indicator of the potential of being transformative. Similarly, holding the betweenness centrality constant, the stronger the burstness, and the stronger the indicator. By defining sigma in this manner, the brokerage mechanism plays a more prominent role than the rate of recognition by peers.

In Chen et al. 2009, the inventors also proposed a generic method of combining multiple metrics using a geometric mean. For example, suppose there are n metrics $\{\rho_i\}$, i=1, ..., n. The geometric mean $\rho$ is defined as follows:

$$\rho = \left(\prod_{i=1}^{n} \rho_i\right)^{\frac{1}{n}} \qquad (19)$$

6. Cluster Labeling and Summarization

The procedure for cluster labeling and summarization is slightly-different between text only and cited references.

Text Only

First, assume that the input data contains text only with no cited references. In this case, networks should be derived from the input text. Entities are units of text, such as terms and passages extracted from text as well as documents, and/or, metadata such as controlled vocabularies assigned to the text. Relations in such networks include co-occurrence, similarity, or probability measures derived from syntactic, statistical, and behavioral patterns using methods such as vector space models, latent semantic indexing, probabilistic latent semantic index, and more generic non-negative matrix factorization (NNMF) and tensor factorization models.

The source text for labeling and summarizing a cluster is the same source of text with restrictions as follows. Given an identified cluster $C_i$, its labeling and summarization source text Text($C_i$) is made of all the documents {d∈D} that contain a sufficient supporting evidence of entities and relations in the network. The level of sufficiency can be determined either based on a predefined threshold for a statistical significance level p, i.e. $(v(d(C_i i, f(v)(\epsilon(p(v)(p_i O.$ Thus:

$$\text{Text}(C_i) = \{d \in D | d \cap C_i \neq \emptyset \wedge (\forall v \in d \cap C_i f(v) \geq \epsilon v p(v) \geq p_0\} \qquad (20)$$

Text with References

Second, if references are available in the source data, two alternative ways of choosing a body of source text become possible for Equation 20: $\text{Text}_{citers}(C_i)$ and $\text{Text}_{citees}(C_i)$. $\text{Text}_{citers}(C_i)$ consists of text of citers to members of the cluster $C_i$ r's, and it is more suitable to represent the impact of the cluster on subsequent research. In contrast, $\text{Text}_{citees}(C_i)$ forms by text of cited references r, thus it represents what the cluster is about. Note these two are not necessarily always the same.

$$\text{Text}_{citers}(C_i) = \{d \in D | \forall r \in C_i, \forall d \in D: \text{cites}(d,r)\} \qquad (21)$$

$$\text{Text}_{citees}(C_i) = \{d \in D | \forall r \in C_i, \forall d \in D: \text{bibliography}(d) = r\} \qquad (22)$$

Each of such Text($C_i$) can be processed as a whole by statistical methods, linguistic methods, or a combination of both so as to reduce its dimensionality. The objective of the dimensionality reduction is to identify the top k most significant factors or components that can adequately cover the essence of the cluster. It should be sufficient to limit the k to the first three dimensions, which correspond to the three most important aspects of the underlying cluster.

Statistical dimensionality reduction can be achieved by using standard information retrieval models such as the simple bag-of-word models (vector space models), or singular value decomposition (SVD) of term-by-document matrices, or non-negative matrix factorization. For example, SVD can approximate an otherwise large matrix with a truncated matrix with less amounts of noise.

Linguistic patterns based on part-of-speech (POS) tagging can identify phrases more naturally than bag-of-word models. For example, a noun phrase can be identified by the pattern of adj.+{noun}, or {noun} to capture phrases like gastric bacteria or cancer cells.

Equation 23 illustrates how a cluster can be characterized by a subset of major dimensions:

$$\text{Text}_{citers}(C_i) \approx \alpha_1 \text{biological\_weapons} + \alpha_2 \text{medical\_response} \qquad (23)$$

A cluster's label can be selected from either a single dimension or a composite of terms from multiple dimensions.

In an exemplary embodiment, candidates of cluster labels are selected from ranked lists of noun phrases and index terms of citing articles of each cluster. Candidate terms can be ranked by different algorithms. They can also be ranked by a consensus-based algorithm that synthesizes rankings from individual algorithms. For example, noun phrases extracted from titles and abstracts of citing articles can be selected from ranked lists generated by term ranking algorithms such as tf*idf(Salton et al., "A Vector Space Model for information Retrieval," Communications of the ACM, Vol. 18(11), pp. 613-620 (1975)), log-likelihood ratio (LLR) tests (Dunning, "Accurate methods for the statistics of surprise and coincidence," Computational Linguistics, Vol. 19(1), pp. 61-74 (1993)), and mutual information (MI). Labels selected by tf*idf weighting tend to represent the most salient aspect of a cluster, whereas those chosen by log-likelihood ratio tests and mutual information tend to reflect a unique aspect of a cluster.

Summarizing a Cluster

Summarization of a cluster can be achieved by enumerating major dimensions by selecting sentences from each dimension or by automatically generating sentences based on corresponding knowledge representations. Specifically, the most representative sentences can be selected as follows to represent one dimension: identify the terms that are most characteristic along this dimension, e.g., in terms of the strengths of their projections on the dimension. Then highly representative terms are used to find sentences that are associated with such terms. For example, selected sentences can form a network. Each sentence is a node. The connection between two sentences indicates how similar they are, e.g. as measured by Jaccard similarity or projections based on eigenvectors of the corresponding matrix. Taking the network of sentences as the input, sentences of the following type are chosen: the sentences that have the highest degree, which are the sentences most central to this particular dimension of the cluster, OR the sentences that have the highest PageRank or other centrality scores. Selected sentences then form the summary of the dimension. Alternatively, summarizations can be constructed by automatic sentence generation based on knowledge representations such as Bayesian belief networks and/or semantic networks of predicates extracted from text.

Transition sentences that link different dimensions are selected as follows. Take sentences for all dimensions and construct a network of sentences. Sentences of high betweenness centrality will be chosen as transition sentences.

The summarization process is iterative in that each cluster is summarized based on summarizations of its component dimensions. At a higher level, all clusters as a whole are summarized in terms of clusters and interrelationships among them.

7. Linearization

The goal of the final stage of the procedure, linearization, is to generate narratives of individual clusters (at least the largest K clusters and their interrelationship). The linearization mechanism traverses the synthesized network of knowledge and provides summarizations of its structure and trends at multiple levels of abstraction, namely prominent members of clusters, clusters, and the system of clusters. The linearization can be made to comply with predefined templates, for example, of narratives in chronological order, in the size of specialties, in the order of novelty, or a nested combination.

Figure 10:
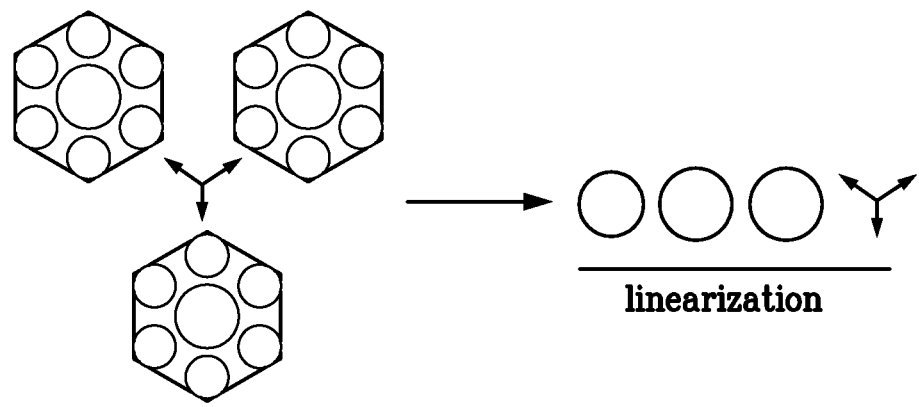
FIG. 10 provides an illustrative process for linearization at both the cluster and domain levels in accordance with the invention.

FIG. 10 provides an illustrative example of the linearization process, which proceeds as follows (contextual steps are included for clarity):

1. Construct a time series of networks of terms and cited references with a time slicing of 1-year intervals.
2. Synthesize the networks to form a synthesized, panoramic network across the entire time frame.
3. Decompose, or divide, the panoramic network into non-overlapping clusters.
4. For each cluster, apply dimensionality reduction techniques to identify up to three most prominent dimensions, factors, or principle components.
5. For each cluster, choose labels and select summarization sentences (sentences with the highest degrees, PageRank, or other centrality scores) to form narratives for the cluster (See FIG. 10).
6. For each cluster, generate the narratives in the following order: a description of the most prominent dimensions and key members of each major dimension (the earliest, the most frequently occurred, the most highly cited, or the fastest growing).
7. At the overall domain level, generate the narratives in the following order: start with the largest cluster and expand its narrative generated in step 6, then move to the next largest cluster until either 80% of the total nodes in the synthesized network are covered, or top 20% of the clusters covered, whichever is reached first. Splits other than 80-20 can be used as needed.

FIG. 10 provides an illustrative process for linearization at both the cluster and domain levels. At the cluster level, the three components are summarized from the most prominent component to the least prominent component. For each prominent component, the algorithm describes the top k most salient prominent nodes, where k is a user-adjustable parameter provided to the algorithm. Transitions from one component to another will be summarized by restricting automatic summarization to the text associated with the strongest path connecting the two components. Similarly, at the network level, i.e., the domain level, start with the largest cluster and identify the nodes with the highest saliency scores and novelty scores, then describe the structure of the cluster in terms of its components and associated summarization.

Figure 11:
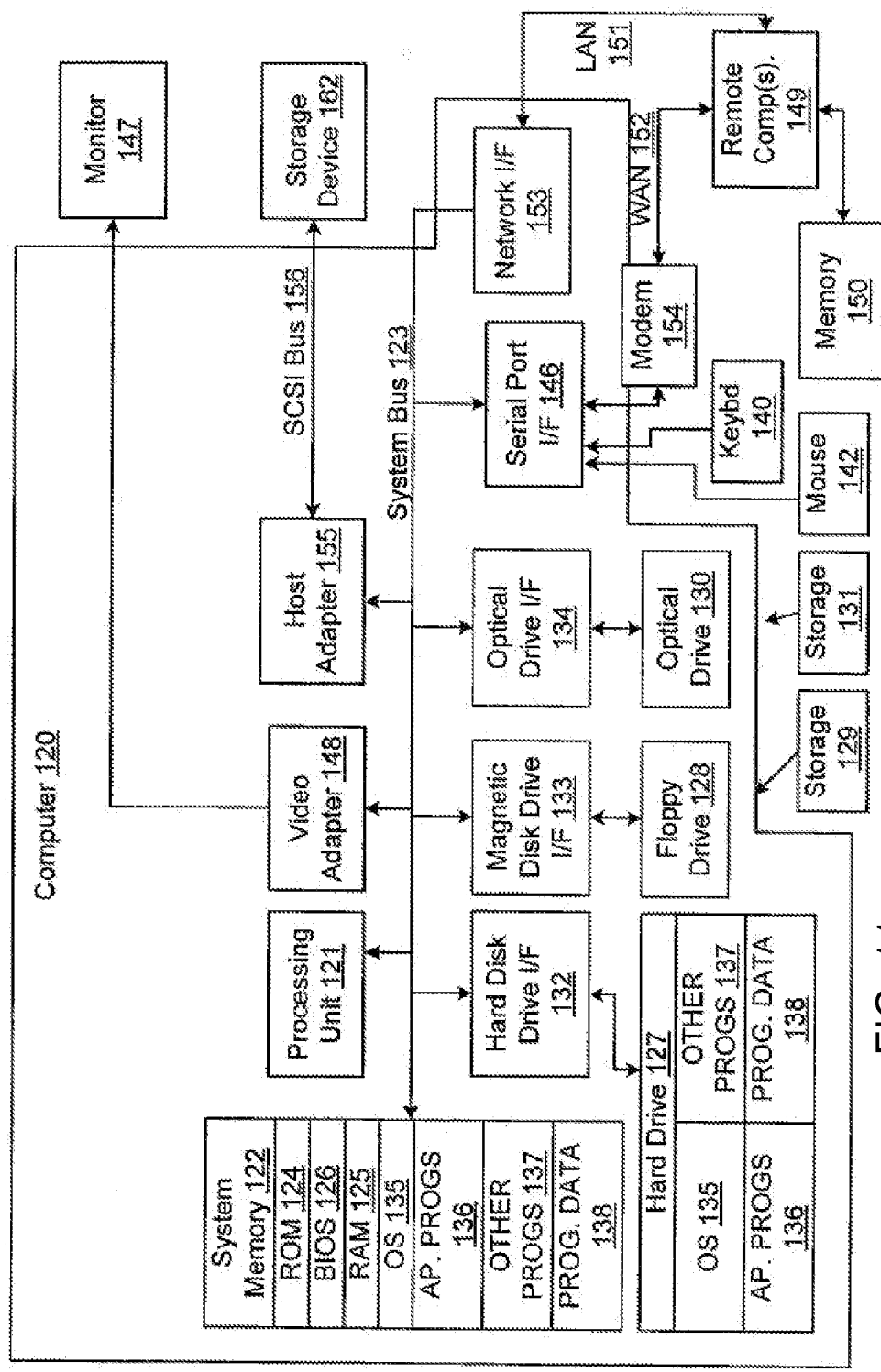
FIG. 11 illustrates a sample hardware system on which the software processes of the invention may be implemented.

In addition to automatically generate a template-filled systematic review of a domain, the procedure of the invention can support the creation of interactive online exploration of the domain with multiple-level, interactive, and coordinated views. FIG. 11 illustrates an illustrative interface design for exploring the source data.

Exemplary Embodiment

The systems and methods of the invention are preferably implemented in software executed by a processor of a computer system of the type illustrated in FIG. 1L The hardware system will be described in connection with FIG. 11 and then the overall procedure as implemented in software will be described with respect to FIGS. 12-20.

System Hardware

FIG. 11 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 11 is a block diagram representing a general purpose computer system in which aspects of the present invention and/or portions thereof may be incorporated. As shown, the exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video/versatile disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 11 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 11. The logical connections depicted in FIG. 11 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computer 120 typically includes a variety of computer readable media. Computer readable media can be any available media that can be accessed by computer 120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Combinations of any of the above should also be included within the scope of computer readable media that may be used to store source code for implementing the flow charts described in detail below.

Software Processes

The methodology of the invention will now be described with respect to FIGS. 12-20.

Figure 12:
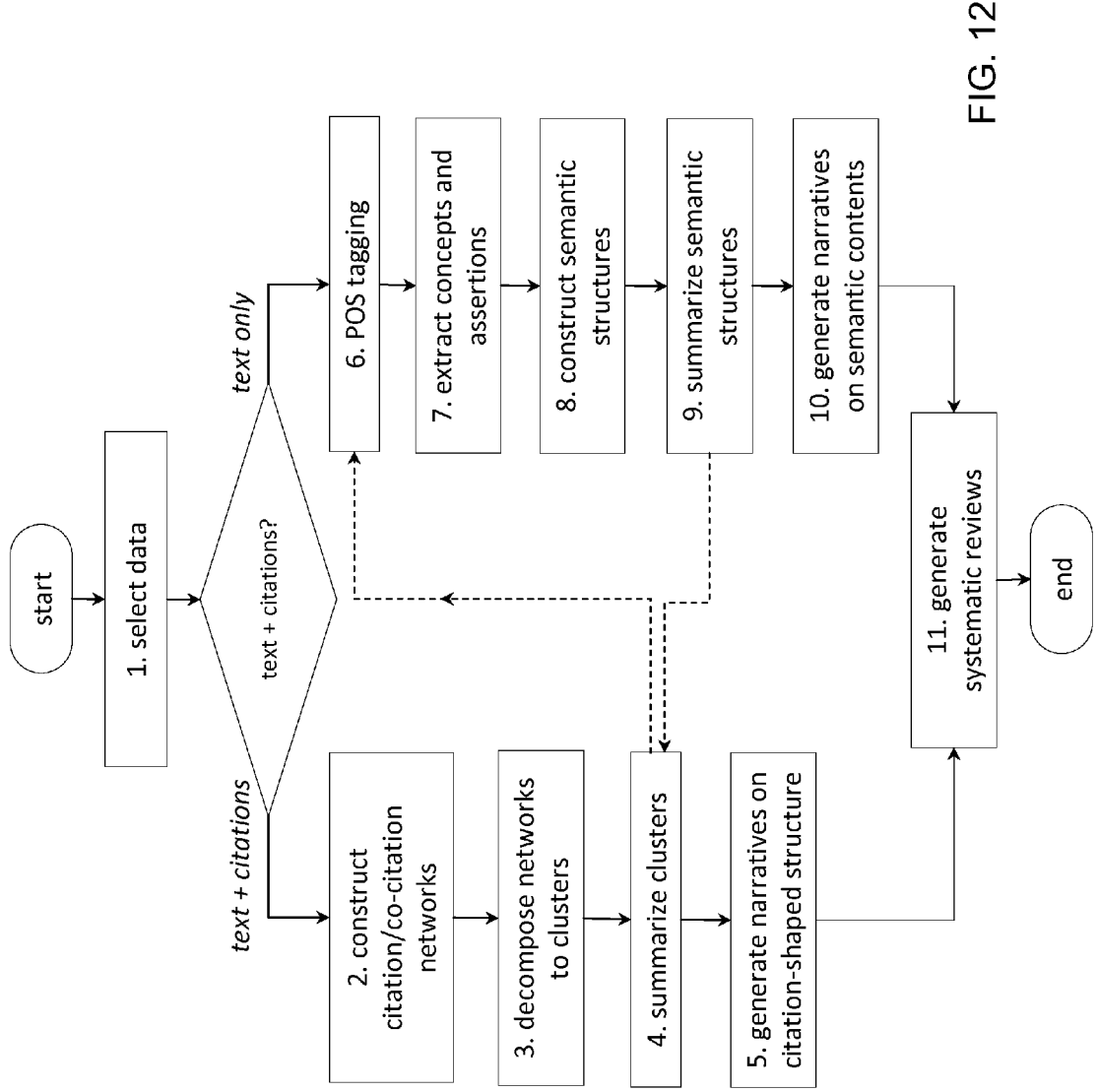
FIG. 12 illustrates a flow chart of the overall software process of the invention.

As illustrated in FIG. 12, the input data may contain two major types: text and citations of the scientific literature of a research field. Citations are also referred to herein as cited references and may not always be available from a given data source. The type of data is thus selected at step 1 and the flow branches to Step 2 or Step 6 depending upon the availability of citation data. Step 4 may utilize the results of Steps 2 and 3 or of Steps 6 through 9 to summarize the clusters. Narratives on the citation-shaped structure are generated at Step 5 and/or narratives on semantic contents are generated at Step 10. The final output of the procedure is an automatically generated, structured systematic review of the research field as generated at Step 11. The process of FIG. 12 will be described in more detail below, where each numbered step in FIG. 12 is shown in an individual flow chart in FIGS. 13-20.

Figure 13:
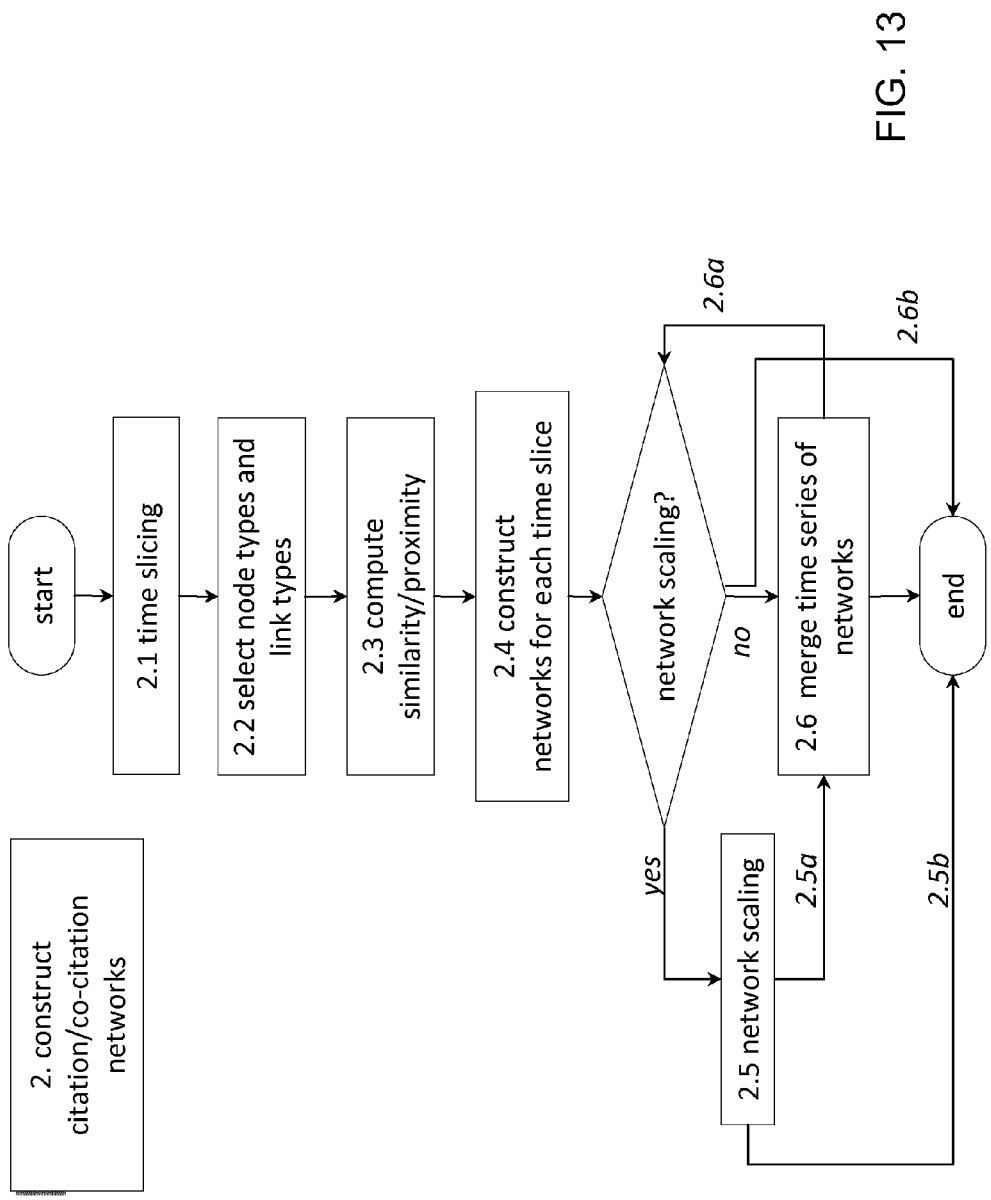
FIG. 13 illustrates Step 2 of FIG. 12, namely, constructing citation/co-citation networks in accordance with the invention.

FIG. 13 illustrates the details of constructing citation/co-citation networks in Step 2 of FIG. 12. First, time slicing at step 2.1 divides the window of analysis into consecutive time intervals—time slices. Adjacent time slices may or may not overlap, depending on specific implementation decisions. Overlapping time slices have the effect of smoothing or moving average. For each time slice, node types and link types are selected at step 2.2. Node types may include various entities found in scientific literature data, notably cited authors, citing authors, cited references, citing articles, institutions, and countries. Link types specify the types of associations between nodes, including co-occurrence of nodes in the same text and in the same list of references. Other link types may be derived from statistical models. Similarity or proximity scores are computed at step 2.3 once node and link types are chosen. Matrices (networks) are constructed for each time slice at step 2.4. Both symmetric and asymmetric matrices are allowed: For example, an author co-citation matrix is a symmetric matrix. In contrast, a term by document matrix is an asymmetric matrix. Network scaling at step 2.5 is optional. The purpose of network scaling is to reduce links while preserving salient link's in the network. A number of possible algorithms can be chosen for this purpose, notably minimal spanning tree (MST) and Pathfinder network scaling. A comparison between MST and Pathfinder network scaling is described by Chen et al. in "Visualizing evolving networks: Minimum spanning trees versus Pathfinder networks," Proceedings of IEEE Symposium on Information Visualization, IEEE Computer Society Press, pp. 67-74 (2003).

Individual networks from all the time slices, scaled or non-scaled, are merged at step 2.6. Networks are merged with an optional local network scaling applied to the overlapping sub-networks. It should be noted that network scaling can be applied to the merged network (2.6a, 2.5b) as well as individual networks (2.5a). A technique for time slicing and merging adjacent networks is described, for example, by Chen in "Searching for intellectual turning points: Progressive Knowledge Domain Visualization," Proc. Natl. Acad. Sci., USA, Vol. 101 (suppl.), pp. 5303-5310 (2004). The contents of these citations are hereby incorporated by reference in their entireties. Sample pseudo code of merging networks includes:

```
Let M be merged network;
For networks g1, g2, ..., gn:
If edge e in gi or gj only, add e to M;
If edge e in both gi and gj,
    If exist e1 and e2 such that weight(e) > weight(e1) + weight(e2),
       discard e;
       otherwise add e to M;
Return M;
```

Figure 14:
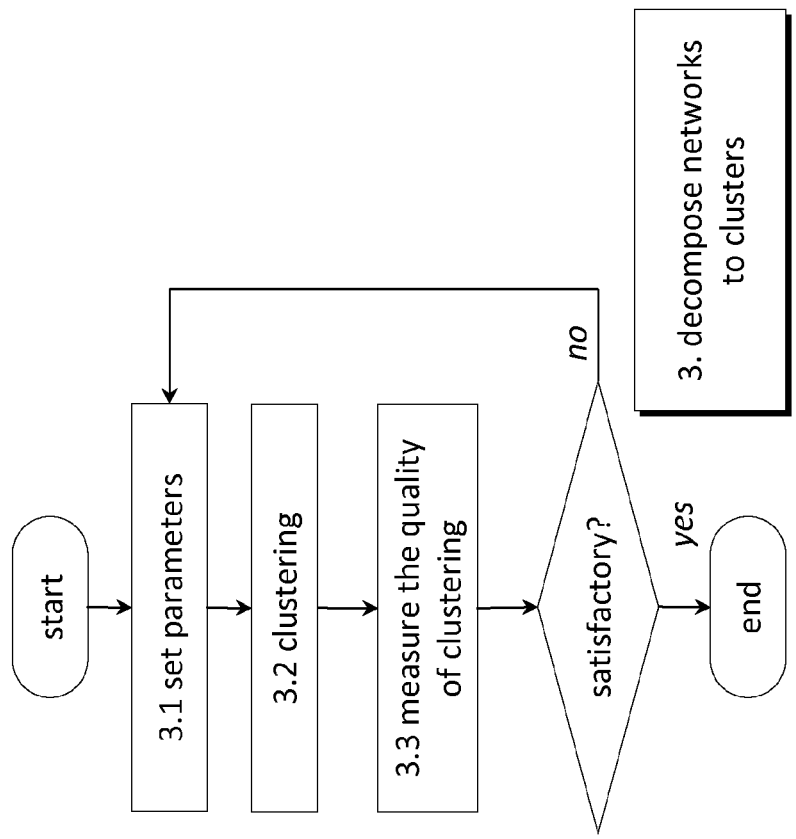
FIG. 14 illustrates Step 3 of FIG. 12, namely, decomposing the merged network into clusters in accordance with the invention.

FIG. 14 illustrates Step 3 of FIG. 12, namely, decomposing the merged network into clusters. One can choose to have either non-overlapping clusters or overlapping clusters. Possible clustering algorithms for this purpose include spectral clustering algorithms, k-mean clustering, eigenvector-based clustering, non-negative matrix factorization, principal component analysis, factor analysis, single-link clustering, centrality-based clustering and many existing algorithms. As illustrated, the cluster parameters for the clustering algorithm are set at step 3.1 and the clustering algorithm is called at step 3.2. The quality of the clustering process can be measured at step 3.3 in terms of modularity and mean silhouette scores. Modularity measures the extent to which a network can be divided into independent blocks or modules and has a score ranging from 0 through 1. A low modularity suggests a network that cannot be reduced to clusters with clear boundaries, while a high modularity may imply a well-structured network. On the other hand, networks with modularity scores of 1 or very close to 1 may turn out to be some trivial special cases where individual components are simply isolated from one another. The silhouette metric, on the other hand, is useful in estimating the uncertainty involved in identifying the nature of a cluster. The silhouette value of a cluster may range from −1 through 1 and indicates the uncertainty that one needs to take into account when interpreting the nature of the cluster. The value of 1 represents a perfect separation from other clusters.

Accordingly, a network with a higher modularity is structurally better defined. A cluster configuration with a higher mean silhouette score is of high homogeneity in terms of the relations between the members of a cluster and other connecting clusters. These metrics can be used to guide the refinement of the clustering quality until the results are satisfactory. Alternatively, predefined parameters can be used based on empirical heuristics to avoid any human intervention at runtime. A description of using a non-overlapping clustering algorithm—spectral clustering—and the use of modularity and silhouette metrics is described in the context of labeling co-citation clusters by Chen, et al. in "the Structure and Dynamics of Co-Citation Clusters: A Multiple-Perspective Co-Citation Analysis," Journal of the American Society for Information Science and Technology (2010) (submitted).

Figure 15:
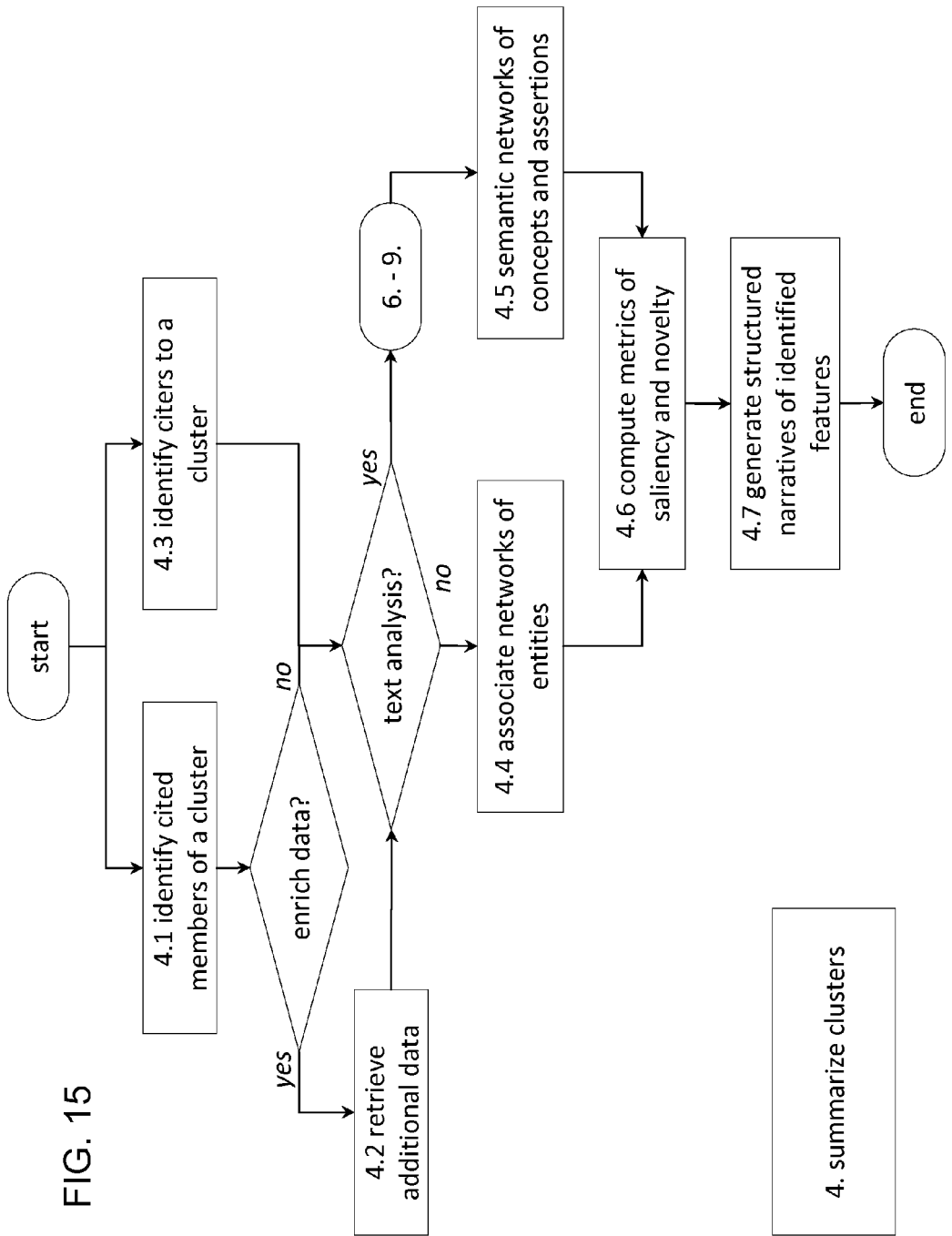
FIG. 15 illustrates Step 4 of FIG. 12, namely, summarization of resultant clusters in accordance with the invention.

FIG. 15 illustrates Step 4 of FIG. 12, namely, summarization of resultant clusters. Preferences can be defined in advance by the user to specify the extent to which summarization should be done to all the clusters, or a percentage of clusters, for example, 20% of the largest clusters in terms of their membership. Clusters along this route include citation clusters as well as co-citation clusters. Citation clusters correspond to directed graphs, whereas co-citation clusters correspond to undirected graphs. Citation clusters can be transformed as a special case of co-citation clusters by splitting members into two groups: one group contains references that are cited by other members at least once and the other group contains the rest of members. The following description therefore focuses on summarizing co-citation clusters.

Each co-citation cluster corresponds to two sets of items: cited members and citers to these members. The cited members of a cluster are identified at step 4.1, and the citers to a cluster are identified at step 4.3. They are treated differently by sub-processes starting with steps 4.1 and 4.3, respectively. Usually cited items contain a lesser amount of information than citing items, which is the case for the Web of Science, Scopus, and Google Scholar, the three most widely used sources of literature data. Data enrichment at step 4.2 is thus optional for retrieving additional information for cited items so that they have the same level of detail. Both cited items and citing items contain text data, notably in terms of abstracts, titles, and, to some extent, the full text. The summarization process branches off to two possible routes: summarization based on structural and temporal properties at step 4.4 and summarization based on text analysis, including natural language-based summarization (See Steps 6 through 9 of FIG. 12). The summarization based on text analysis may treat the cluster as semantic networks of concepts and assertions, as illustrated at step 4.5.

To summarize structural and temporal properties of a cluster, the cluster is treated as an associative network and metrics of saliency and novelty are computed at step 4.6. Saliency metrics may include the total number of citations received by cited items, the total number of collaborating papers published by authors, and the frequency of term occurrence. As noted above, saliency metrics aim to identify prominent items to the associated scientific field, while novelty metrics aim to measure the extent to which an item is new with respect to the existing time frame of analysis. Useful measures include the degree of sudden increases of access or citation (so-called burst), and the recentness of an item (when it is published for the first time). Items in each cluster are ranked by these numerical metrics at step 4.6. The summarization of the cluster at step 4.7 consists of narratives that run through the ranked list of items according to the descending order of saliency and novelty. Users may configure the system so as to start with saliency features or novelty features.

A cluster may be referred to either by its serial number or by labels chosen for the cluster. Cluster labels can be chosen based on the most frequent or most common terms found in its members, or based on available indexing models such as vector space models or variant versions such as latent semantic indexing, probabilistic latent semantic indexing, or non-negative matrix factorization. Statistical term distribution models may be also used to choose a cluster label. Log-likelihood ratio tests and mutual information are possible term ranking mechanisms. Once candidate terms are ranked, top-ranked terms are chosen as the titles of clusters.

The following is an illustrative example narrative of a summary of a cluster:

Cluster XXX is the _____ th largest cluster among the total of _____ clusters. Cluster XXX contains _____ members, which is the _____ % of the total number of nodes in the entire merged network.

Cluster XXX is labeled as _____ according to algorithm1, _____ according to algorithm2, and _____ according to algorithm3. The mean silhouette score of this cluster is _____, which is relatively high/low, suggesting a concentration or the lack of a concentration.

These members are cited collectively by _____ articles. The most cited member is _____ (_____ times). The second most cited member is _____ (_____ times). ....... The earliest member in this cluster was published in year _____. The most recent member was published in year _____. The average age of the members in this cluster is _____ years. The total span from the earliest to the latest members is _____ years. The item that has the largest citation burst is _____ (burst rate _____). Item _____ has the highest centrality score. Item _____ has the highest sigma score (a combination of structural and temporal properties). [A figure of citation history can be automatically inserted here for one of the items described.]

The most prominent citer to Cluster XXX is _____, which cites _____ members of the cluster. The second most prominent citer is _____, citing _____ members. The most common terms used by these citers are _____, _____, and _____.

Figure 16:
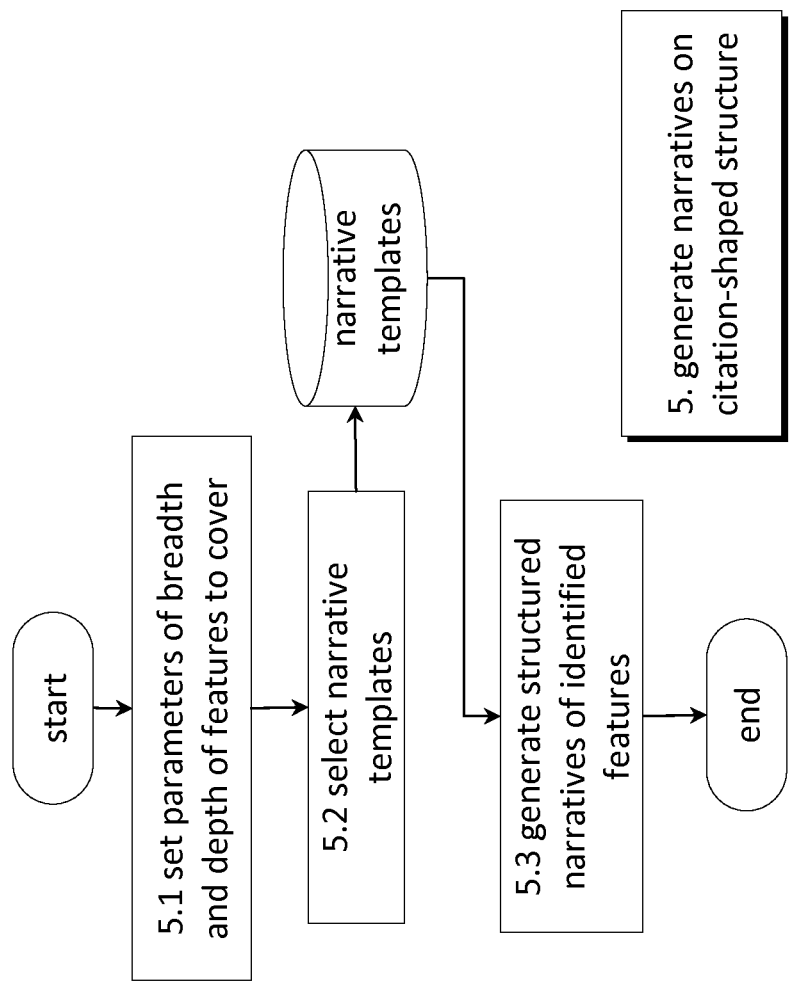
FIG. 16 illustrates Step 5 of FIG. 12, namely, generating narratives on a citation-shaped structure.

FIG. 16 illustrates Step 5 of FIG. 12, namely, generating narratives on a citation-shaped structure. The purpose of generating narratives is to synthesize narratives for the entire merged network. Alternatively, users may set parameters at step 5.1 to control the breadth and depth of features to cover in the narratives. For example, one may choose to summarize 40% of the largest clusters among all the clusters found. One may also choose to include all the features or a subset of saliency and novelty features. In addition to generate narratives of a subset of clusters based on their size, the system can also take into account their silhouette values. For example, a cluster with low silhouette value may be omitted from the summary. A cluster with a handful of members may be also omitted. Similarly, a cluster that is essentially formed by the citing behavior of one or two citing articles can be omitted too. Users may choose a narrative template from a set of predefined templates at step 5.2. Templates specify the order of narratives in terms of the sequence of how various features should be described and where supporting images should be inserted. Templates may also specify citation styles to be used along with narratives, for example, "The most cited reference in this cluster is [5]," or "The most cited reference in this cluster is by Smith (2010)." Structures narratives of the identified features may be generated from these templates at step 5.3.

Figure 17:
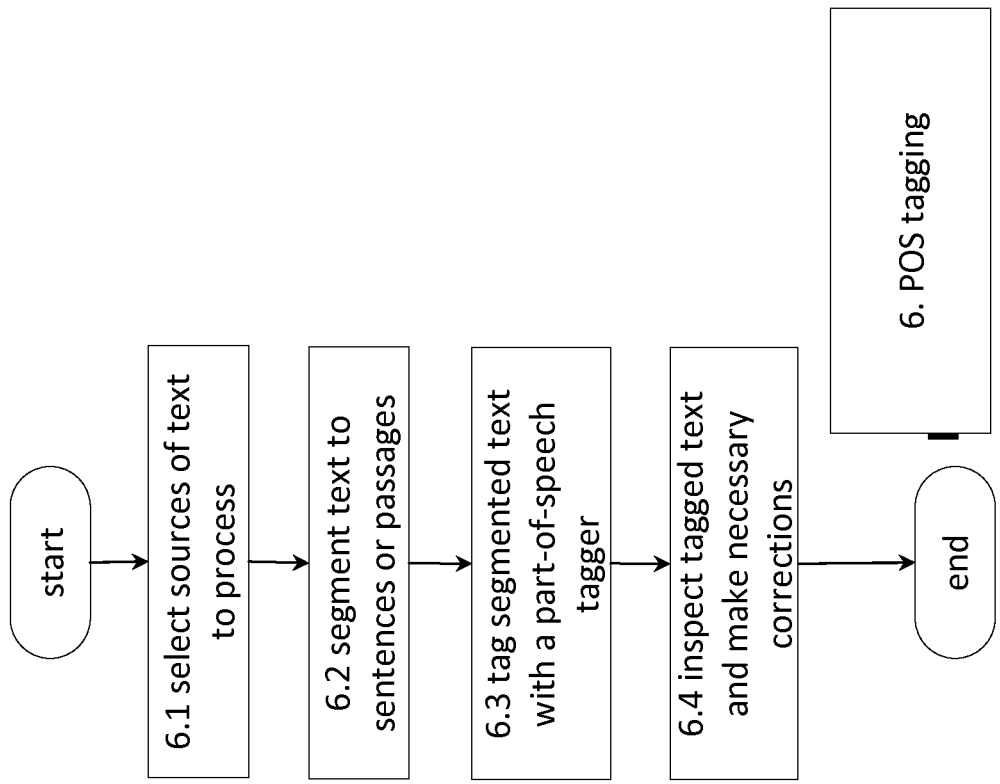
FIG. 17 illustrates Step 6 of FIG. 12, namely, the process for part-of-speech (POS) tagging.

FIG. 17 illustrates Step 6 of FIG. 12, namely, the process for part-of-speech (POS) tagging. POS tagging is a natural language processing technique that takes a stream of text as input at step 6.1 and outputs a stream of annotated text. Each word is annotated by the type of the word, such as noun, verb, or adjective. To improve the quality of POS tagging, text can be segmented into sentences, paragraphs, or other types of passages at step 6.2 and the segmented text tagged with a part-of-speech tagger at step 6.3. POS tagging results may contain inaccurately tagged words. The user may inspect the tagged text at step 6.4 and incorporate heuristics into post-processing algorithms to correct the types of errors found. The inspection is not necessary, but it is advisable as a fine-tune process of the overall procedure.

Figure 18:
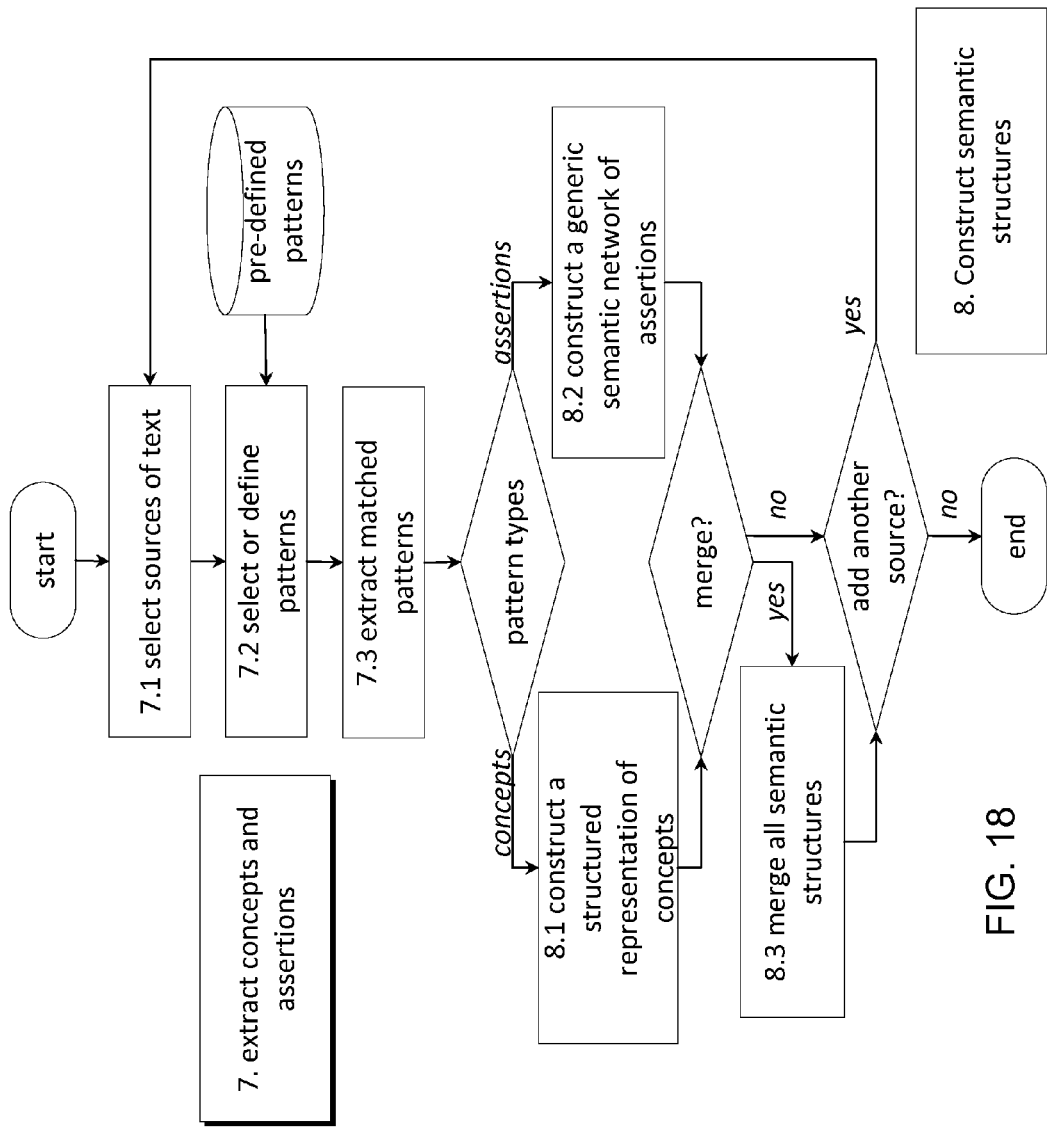
FIG. 18 illustrates Steps 7 and 8 of FIG. 12, namely, the process of extracting concepts and assertions and constructing semantic structures of text based on POS tagged text.

FIG. 18 illustrates Steps 7 and 8 of FIG. 12, namely, the process of extracting concept and assertions and constructing semantic structures of text based on POS tagged text. Since the process may deal with multiple sources of input text as well as a single source, sources of text are selected at 7.1. When multiple sources are added, the system will merge the resultant semantic structures. Then, at 7.2. a set of patterns that characterize target components are defined or stored pre-defined patterns are selected. Patterns defined as regular expressions are sect forth below. Matched concepts and assertion patterns are then extracted at 7.3. The semantic structures are then constructed at 8.1 and 8.2 based on whether the pattern is a concepts pattern or an assertions pattern. As will be appreciated by those skilled in the art, a concept is characterized by patterns of nouns with various modifiers, while an assertion is defined by a complex set of building-block patterns, including a subject, a verb, and an object. For example, "we propose a new algorithm" can be identified by pattern matching as an assertion. The phrase "supermassive blackholes" defines a concept. The root of the concept is "blackhole," which is modified by the adjective "supermassive." Concepts and assertions are decomposed into more fundamental components which, in turn, will be used to construct a generic semantic network at 8.1 or 8.2. For example, the assertion "we propose a new algorithm" is divided into "we," "propose," and "a new algorithm." The phrase "new algorithm" can be further divided into "algorithm" and its modifier "new." These components form entities in a semantic network. The nature of interconnections between entities is determined by their context. For example, "we" and "propose" are connected by the type of subject-verb relation. "New" and "algorithm" are connected by the type of attributive relation.

Regular Expression Patterns

The following patterns illustrate the pattern matching technique that can be used for Step 7 illustrated in FIG. 18. These patterns are defined hierarchically. Complex patterns are built on simple patterns. The syntax follows the Java language.

```
// a white space is defined as one or more space characters, possibly
// proceeded by a comma or a semicolon.
Public static String w = "[,;]*\\s+";
// a word is defined as a string of printable characters, including one or more hyphens.
// (?: pattern) instructs the program not to memorize the matched pattern.
Public static String word = "(?:[-\\w]+)";
// a single tagged word is defined as a word followed by a part-of-speech tag. Note that
// if source text contains /, it should be replaced with a different character, such as @
// For example: international/nnp is a POS-tagged word
public static String tagged_word = "(?:" + word + "/[\\w+]+)";
// multiple tagged words consists of one or more tagged_word
public static String tagged_words = "(?:" + tword + w + ")+";
// a single verb is defined by POS tags such as /vb, /vbd, /vbz , /vbp, and /vbn,
```

-continued

```
// but except /vbg
public static String single_verb = "(?:" + word + "/vb[dzpn[^g]])";
// a joint verb group is defined as two single verbs jointed by an and or an or
public static String verbs = "(?:" + single_verb + "(?:" + w + word + "/cc" + w +
single_verb + ")*" + ")";
// a verb group consists of auxiliary terms such as could, should, and would, which are
// tagged as /md and followed by verbs and possibly indefinite verb phrases such as to apply.
Public static String verb = "(?:" + word + "/md\\s+)*" + "(" + _verb1 +
"(?:(?:\\s+" + word + "/in)|(?:\\s+" + word + "/to\\s+" + _verb1 + "))*)+";
//article
public static String dt = "(?:" + word + "/dt)";
// adverb
public static String rb = "(?:" + word + "/rb)";
// single adjective, e.g., really hot
public static String adj = "(?:" + "(?:" + rb + "\\s+)*" + word + "/jj[s]*)+";
// multiple adjectives, e.g., hot and sore
public static String adjs = "(?:" + adj + "(?:\\s+" + word + "/cc\\s+" + adj + ")*)";
// a single noun. Note that Stanford tagger may tag a word along with a punctuation, e.g.,
Water,/nn
public static String _noun = "(?:" + word + "/nn[sp]*)";
// a noun may be modified by an article and/or a number of adjectives.
// for example, really/rb hot/jj and/cc sore/jj vinger/nn, cold/jj water/nn
public static String noun = "(?:" + "(?:" + dt + "\\s+)*" + "(?:" + adjs + "\\s+)*" +
_noun + ")";
// two nouns jointed by an and or an or
public static String nouns2 = "(?:(?:" + noun + "(?:" + w + ")*(?:"+ word + "[,;]*/cc"
+ w + ")*)*" + noun + ")";
// auxiliary definition
public static String nouns = "(?:" + noun +")";
///////////////////////////////// noun_phrase /////////////////////////////////
// a noun of noun
public static String noun_phrase = "((?:" + nouns2 + w + "of/in" + w+ ")*" + nouns2 +
")";
// gerund, used as part of a predicate
public static String vbg = "(" + word + "/vbg" + w + twords + "(?:" + noun + "|" +
noun_phrase +")*)";
// a subject is defined either as a noun, a noun phrase, or a proposition
public static String subject = "(" + noun + "|" + noun_phrase + "|" + word + "/prp)";
// relation, such as greater than, less than, equal to
public static String relation = "(?:" + word + "/jjr\\s+" + word + "/in)";
//////////////////// action ////////////////////
// example: can be classified: can/md be/vb classified/vbn
public static String action = "(" + word + "/md\\s+)*" + "(?:" + word + "/rb\\s+)*" +
"(?:" + _verb + "[\\s+]*)+";
public static String actions = "((?:" + action + "(?:" + w + word + "/cc" + w + action
+ ")*)|" + relation + ")";
// clause
public static String clause ="(" + noun + w + "that/in" + w + twords + ")";
// an object is defined as either a gerund, a noun phrase, or a clause
public static String object = "(?:" + vbg + "|" + noun_phrase + "|" + clause + ")*";
///////////////////////// assertion /////////////////////
// an assertion is defined as the structure of a subject + a verb group + a noun phrase or a gerund
public static String assertion = "(?:" + subject1 + w + verb + w + "(" + noun_phrase
+ "|" + noun + "|" + vbg + "))";
///////////////////////// predicate /////////////////////
public static String predicate = "(" + noun + w + verb + ")";
// rhetorical pattern
public static String rhetorical = "(" + subject + w + actions + w + "that/in)";
```

Semantic networks generated at 8.2 can be stored as a network or a hierarchical structure. In order to be stored as a hierarchy, head nouns are treated as parent nodes and their attributive nodes are treated as children nodes. For example, "algorithm" is the parent of "new" in the above example. Similarly, "we" is the parent node of "propose," which is in turn the parent node of "algorithm."

A new semantic structure can be merged with an existing semantic structure at 8.3. For comparative studies, it is often useful to differentiate two different sources. Two semantic components from two different sources may be related in two possible ways: 1. The two components overlap, 2. The two components do not overlap. Merging two structures can be done by merging common ancestor nodes up to where they differ. For example, merging "we propose a new algorithm" with "we propose a faster algorithm" would align "we," "propose," and "algorithm," but branch off to two different nodes "new" and "faster" as the children nodes of "algorithm." Sample pseudo code for a pattern matching routine is set forth below:

Pseudo code of pattern matching:

```
Let C be a concept tree;
Let P be a predicate tree;
For sentences s1, s2, ..., sn:
Find concept patterns and assertion patterns in si;
If c is found, add c to C;
If p is found, add p to P;
Return C, P;
Add c to C:
Find parent(c) in C;
```

-continued

```
If found, find children(c) in C;
    If found, update frequencies of parent(c) and children(c)
    Otherwise, add children(c) to parent(c)
Otherwise, add parent(c) to the root, then add children(c) to parent(c)
Return;
Add p to P:
Find subject(p) in P;
If found, find verb(p) in P;
    If found, find object(p) in P,
        if found, update existing p;
        otherwise add object(p) to verb(p);
    Otherwise, add verb(p) to subject(p) and add object(p) to verb(p);
Otherwise, add subject(p) to the root,
    add verb(p) to subject(p);
    add object(p) to verb(p);
Return;
```

As illustrated in FIG. 18, another source may be added and the process of FIG. 18 repeated, or the process ends if no other source is to be added.

Figure 19:
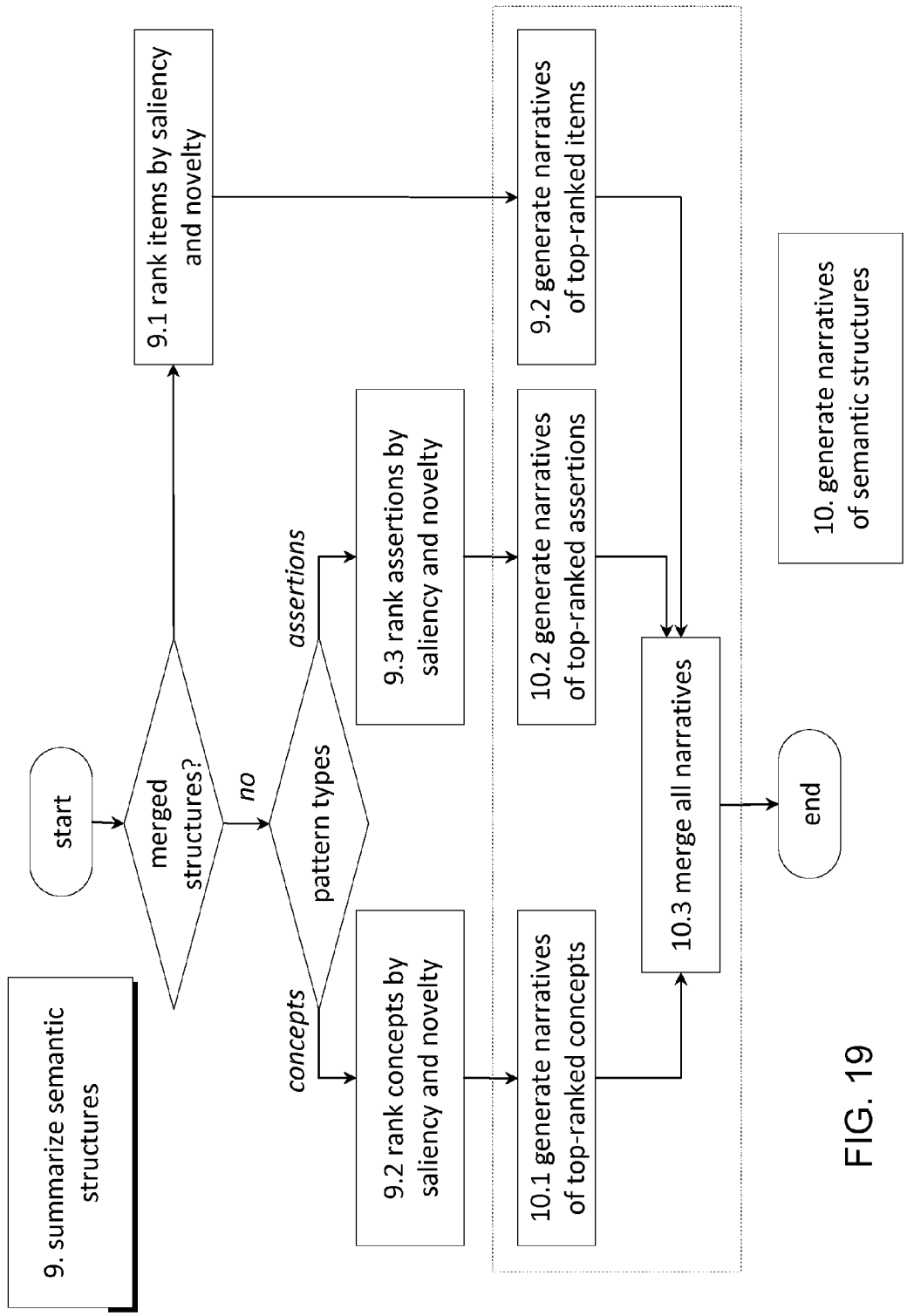
FIG. 19 illustrates Steps 9 and 10 of FIG. 12, namely, the process for summarizing semantic structures (Step 9) and generating narratives (Step 10).

FIG. 19 illustrates Steps 9 and 10 of FIG. 12, namely, the process for summarizing semantic structures (Step 9) and generating narratives (Step 10). There are two possible types of input to this process: merged structures that combine both concepts and assertions and separated structures of concepts and assertions. Both types of input need to be ranked in terms of saliency and novelty. This is done at step 9.1 for merged structures and at steps 9.2 and 9.3 for separated structures of concepts (9.2) and assertions (9.3). In accordance with the method of the invention, the saliency of a concept can be defined in terms of the size of its sub-tree, i.e. the number of children or the number of generations it has. The total number of occurrences of the root concept node can be used as well. The novelty of a concept can be defined in terms of the average age of its children, the youngest child's age, its burst rate in text, or the first appearance in multiple sources of text. On the other hand, the saliency of an assertion can be defined in terms of the saliency of its subject, its verb, and/or its object. Similarly, the novelty of an assertion can be defined in terms of its POS components.

Figure 20:
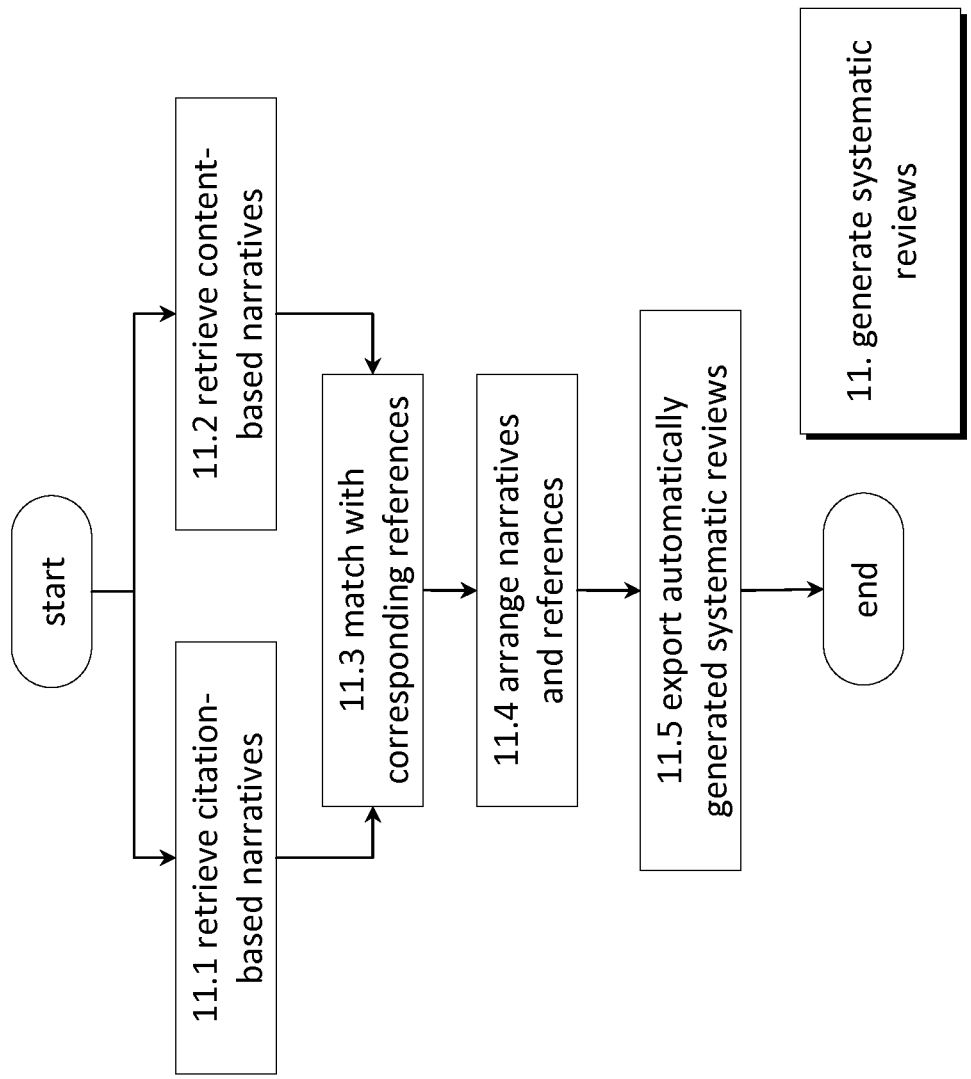
FIG. 20 illustrates the final step of generating systematic reviews in Step 11 of FIG. 12.

Merged structures contain assertions further annotated by concept trees, for example, we+propose+algorithm+(a) new; (b) faster. The saliency of such structures can be derived from the saliency of corresponding assertion and concept components. The novelty measure can be similarity derived. Narratives of the top-ranked concepts (10.1), assertions (10.2), and items (9.2) are generated and all narratives for both types of patterns are merged in a user predefined order at 10.3, for example, narratives of concepts first, then narratives of assertions, and finally both. The following is an illustrative example:

As illustrated in FIG. 20, the process of generating systematic reviews includes retrieving the citation-based narratives at step 11.1 and retrieving the content-based narratives at step 11.2. The retrieved narratives are matched with corresponding references at step 11.3 and arranged at step 11.4 and automatically generated systematic reviews are exported at step 11.5. The resultant automatic systematic review consists of summaries of the main intellectual structure defined by citation behavior of the corresponding scientific community and summaries of contents in terms of salient and novel concepts and assertions made by citers as well as cited articles. The systematic review identifies key components of a scientific field. It will serve either as a jump start for additional manual refinements or as a machine-generated and periodically renewed systematic review.

It should be understood that this invention is not limited to the particular embodiments disclosed, but it is intended to cover modifications within the spirit and scope of the present invention as defined by the appended claims. All such modifications of the invention are intended to be covered by the appended claims.

What is claimed:

1. A computer-implemented method for automatically generating systematic reviews of documents in a field of literature, comprising a programmed processor performing the following steps:
    constructing associative networks of documents within the received documents;
    decomposing the associative networks into clusters of fields or topics;
    performing part-of-speech tagging of text within the received documents;
    constructing semantic and ontological structures and/or assertions extracted from the documents;
    generating citation-based and content-based summaries of the clusters of topics or fields and the semantic and ontological structures; and
    generating structured narratives of the clusters of field or topic-characterizing documents and the summaries of the generated semantic structures,
    wherein constructing associative networks of documents within the received documents comprises the processor selecting node types and link types for each time slice of the received documents, computing similarity or proximity scores for the nodes, constructing networks of the node information, and merging respective networks from different time slices.

2. The method of claim 1, further comprising the programmed processor performing the step of merging narra- The most important concept based on the first ____ years of text is _____. It has a total of ____ generations of _____ children nodes. The size of its sub-tree contains ____% of all the nodes in the concept tree. The most novel concept is _____, which has a burst of occurrence of _____ between ____ and ____.
The most prominent assertion is _____ + _____ + _____. The object _____ has a total of _____ generations of _____ attributive nodes. The most novel assertion is _____ + _____ + _____, which first appears in year _____ with a burst duration of _____ years since _____.

The final step of generating systematic reviews (Step 11 of FIG. 12) is illustrated in FIG. 20. The goal is to merge the narratives of two types of data: citation-based and content-based summaries. The order of the appearance between citation-based and content-based summarized can be predefined by users, for example, citation-based summaries to be followed by content-based ones. Corresponding references will be inserted into narratives accordingly.

tives of the citation-based and content-based summaries into a systematic review having a predetermined arrangement.

3. The method of claim 2, wherein generating citation-based and content-based summaries of the clusters of fields or topics and the semantic structures comprises the processor measuring the saliency, novelty, significance, and transformative features of individual documents in the clusters of fields or topics and semantic structures.

4. The method of claim 3, wherein generating structured narratives of the cluster of fields or topics and the summaries of the generated semantic structures comprises the processor labeling and summarizing features of the clusters of fields or topics and delinearizing the characteristics of such clusters into templates that provide summarizations of the structure and trends of the topic or field evolution in the clusters of fields or topics at multiple levels of abstraction.

5. The method of claim 1, wherein the field of literature comprises scientific literature and the systematic review comprises a systematic review of a research field in the scientific literature.

6. The method of claim 1, wherein decomposing the associative networks into clusters of topics or fields comprises the processor clustering nodes and measuring quality of the clustering by calculating modularity and/or mean silhouette scores for the clusters of fields or topics.

7. The method of claim 6, wherein generating citation-based and content-based summaries of the clusters of fields or topics and the semantic structures comprises the processor identifying citers to and cited members of a cluster, summarizing structural and temporal properties of the cluster, computing metrics of saliency and novelty for an associative network formed by the cluster, ranking the clusters based on the saliency and/or novelty metrics, and generating structured narratives from the ranked clusters.

8. The method of claim 1, wherein generating structured narratives of the clusters of fields or topics and the summaries of the generated semantic structures comprises the processor selecting a narrative template from a set of predefined templates.

9. The method of claim 1, wherein performing part-of-speech tagging comprises the processor annotating the received documents by a type of each word in the received documents.

10. The method of claim 9, wherein performing part-of-speech tagging further comprises the processor segmenting the received documents into sentences, paragraphs, or other types of passages.

11. The method of claim 1, wherein constructing semantic structures of concepts and/or assertions extracted from the tagged text comprises the processor constructing a structured representation of concepts and a semantic network of assertions in the received documents.

12. The method of claim 11, wherein constructing semantic structures of concepts and/or assertions extracted from the tagged text further comprises the processor merging a newly constructed semantic structure with an existing semantic structure to differentiate different sources for the newly constructed and existing semantic structures.

13. The method of claim 12, wherein constructing semantic structures of concepts and/or assertions extracted from the tagged text further comprises the processor ranking merged semantic structures based on saliency and novelty, generating narratives of top ranked concepts and/or assertions in the received documents, and merging generated narratives in a predetermined order.

14. The method of claim 1, further comprising quantifying a potentially creative work by constructing quantitative metrics from structural variations in the work due to newly introduced concepts, conceptual relations, and conceptual structures where structural variations are computed as a degree of deviation from a network structure of contemporary knowledge.

15. A system for automatically generating systematic reviews of received documents in a field of literature, comprising a processor programmed to perform the following steps:
constructing associative networks of documents within the received documents;
decomposing the associative networks into clusters of topics or fields;
performing information extraction within the received documents to provide tagged text;
constructing semantic structures of concepts and/or assertions extracted from the tagged text;
generating citation-based and content-based summaries of the clusters of topics or fields and the semantic and ontological structures; and
generating structured narratives of the clusters of topics or fields and the summaries of the generated semantic structures
wherein the programmed processor constructs associative networks of documents within the received documents by selecting node types and link types for each time slice of the received documents, computing similarity or proximity scores for the nodes, constructing matrices of the node information, and merging respective matrices from different time slices.

16. The system of claim 15, wherein the programmed processor further performs the step of merging narratives of the citation-based and content-based summaries into a systematic review having a predetermined arrangement.

17. The system of claim 16, wherein the programmed processor measures the saliency, novelty, significance, and transformative features of individual documents in the clusters of fields or topics and semantic structures.

18. The system of claim 17, wherein the programmed processor labels and summarizes fields or topics of the clusters of fields or topics and delinearizes the resulting clusters into templates that provide summarizations of the structure and trends of the information in the clusters of topics or features at multiple levels of abstraction.

19. The system of claim 15, wherein the field of literature comprises scientific literature and the systematic review comprises a systematic review of a research field in the scientific literature.

20. The system of claim 15, wherein the programmed processor decomposes the associative networks into clusters of fields or topics by clustering nodes and measuring quality of the clustering by calculating modularity and mean silhouette scores for the clusters of fields or topics.

21. The system of claim 20, wherein the programmed processor generates citation-based and content-based summaries of the clusters of fields or topics and the semantic structures by identifying citers to and cited members of a cluster, summarizing structural and temporal properties of the cluster, computing metrics of saliency and novelty for an associative network formed by the cluster, ranking the clusters based on the saliency and/or novelty metrics, and generating structured narratives from the ranked clusters.

22. The system of claim 15, wherein the programmed processor generates structured narratives of the clusters of fields or topics and the summaries of the generated semantic structures by selecting a narrative template from a set of predefined templates.

23. The system of claim 15, wherein the programmed processor performs part-of-speech tagging by annotating the received documents by a type of each word in the received documents.

24. The system of claim 23, wherein the programmed processor performs part-of-speech tagging by segmenting the received documents into sentences, paragraphs, or other types of passages.

25. The system of claim 15, wherein the programmed processor constructs semantic structures of concepts and/or assertions extracted from the tagged text by constructing a structured representation of concepts and a semantic network of assertions in the received documents.

26. The system of claim 25, wherein the programmed processor constructs semantic structures of concepts and/or assertions extracted from the tagged text by merging a newly constructed semantic structure with an existing semantic structure to differentiate different sources for the newly constructed and existing semantic structures.

27. The system of claim 26, wherein the programmed processor constructs semantic structures of concepts and/or assertions extracted from the tagged text by ranking merged semantic structures based on saliency and novelty, generating narratives of top ranked concepts and/or assertions in the received documents, and merging generated narratives in a predetermined order.

28. The system of claim 15, wherein the programmed processor further quantifies a potentially creative work by constructing quantitative metrics from structural variations in the work due to newly introduced concepts, conceptual relations, and conceptual structures where structural variations are computed as a degree of deviation from a network structure of contemporary knowledge.

29. A computer readable storage medium having instructions stored thereon that when processed by a processor cause the processor to implement a method for automatically generating systematic reviews of documents in a field of literature, wherein the instructions, when executed by the processor, cause the processor to perform the following steps:

constructing associative networks of documents within the received documents;

decomposing the associative networks into clusters of fields or topics;

performing part-of-speech tagging of text within the received documents;

constructing semantic and ontological structures of concepts and/or assertions extracted from the documents;

generating citation-based and content-based summaries of the clusters of topics or fields and the semantic and ontological structures; and generating structured narratives of the clusters of field or topic-characterizing documents and the summaries of the generated semantic structures wherein the programmed processor constructs associative networks of documents within the received documents by selecting node types and link types for each time slice of the received documents, computing similarity or proximity scores for the nodes, constructing matrices of the node information, and merging respective matrices from different time slices.

30. The storage medium of claim 29, further comprising instructions that when executed by the processor cause the processor to perform the step of merging narratives of the citation-based and content-based summaries into a systematic review having a predetermined arrangement.

31. The storage medium of claim 29, further comprising instructions that when executed by the processor cause the processor to perform the step of quantifying a potentially creative work by constructing quantitative metrics from structural variations in the work due to newly introduced concepts, conceptual relations, and conceptual structures where structural variations are computed as a degree of deviation from a network structure of contemporary knowledge.

* * * * *